United States Patent
Sicola et al.

(10) Patent No.: US 6,629,264 B1
(45) Date of Patent: Sep. 30, 2003

(54) CONTROLLER-BASED REMOTE COPY SYSTEM WITH LOGICAL UNIT GROUPING

(75) Inventors: Stephen J. Sicola, Monument, CO (US); Susan G. Elkington, Colorado Springs, CO (US); Michael D. Walker, Colorado Springs, CO (US); James E. Pherson, Colorado Springs, CO (US); Roger L. Oakey, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/538,908

(22) Filed: Mar. 30, 2000

(51) Int. Cl.[7] .................................................. G06F 11/00
(52) U.S. Cl. ........................................... 714/15; 714/18
(58) Field of Search ............................... 714/7, 4, 5, 6, 714/20, 18, 15, 12; 707/201, 204

(56) References Cited

U.S. PATENT DOCUMENTS

| | | | |
|---|---|---|---|
| 5,274,645 A | | 12/1993 | Idleman et al. ............. 371/10.1 |
| 5,734,818 A | * | 3/1998 | Kern et al. .................... 714/20 |
| 5,771,344 A | * | 6/1998 | Chan et al. ...................... 714/7 |
| 6,167,531 A | * | 12/2000 | Sliwinski ...................... 714/13 |
| 6,199,074 B1 | * | 3/2001 | Kern et al. .................. 707/204 |
| 6,308,284 B1 | * | 10/2001 | LeCrone et al. ............... 714/6 |

OTHER PUBLICATIONS

Sicola, Stephen J. et al., U.S. Patent Application, Fault Tolerant Storage Controller Utilizing Tightly Coupled Dual Controller Modules, Ser. No. 08/071,710, filed Jun. 4, 1993, pp. 1–90.

* cited by examiner

Primary Examiner—Robert Beausoliel
Assistant Examiner—Marc Duncan

(57) ABSTRACT

A data replication system having a redundant configuration including dual Fiber Channel fabric links interconnecting each of the components of two data storage sites, wherein each site comprises a host computer and associated data storage array, with redundant array controllers and adapters. The system employs the grouping of logical units into 'association sets', for logging and failover purposes. The concept of association sets allows the system provides for proper ordering of I/O operations during logging across multiple volumes. In addition, association sets are employed by system to provide failure consistency by causing the group of logical units/volumes to all fail at the same time, ensuring a point in time consistency on the remote site.

10 Claims, 19 Drawing Sheets

CONTROLLER-BASED REMOTE COPY SYSTEM WITH LOGICAL UNIT GROUPING

FIELD OF THE INVENTION

The present invention relates generally to data consistency in data storage systems, and more specifically, to a method for grouping logical units to provide proper ordering of I/O operations and failure consistency in a controller-based remote data replication system.

BACKGROUND OF THE INVENTION AND PROBLEM

It is desirable to provide the ability for rapid recovery of user data from a disaster or significant error event at a data processing facility. This type of capability is often termed 'disaster tolerance'. In a data storage environment, disaster tolerance requirements include providing for replicated data and redundant storage to support recovery after the event. Unlike local environments, where a single host system is associated with the storage, disaster tolerant environments often use a completely replicated system for error recovery. As such, data stored on all of the volumes must be consistent at a point in time in order for an application to start, identify where the application left off, and to continue, after an error event. In order to provide a safe physical distance between the original data and the data to backed up, the data must be migrated from one storage subsystem or physical site to another subsystem or site. It is also desirable for user applications to continue to run while data replication proceeds in the background. Data warehousing, 'continuous computing', and Enterprise applications all require remote copy capabilities.

Storage controllers are commonly utilized in computer systems to off-load from the host computer certain lower level processing functions relating to I/O operations, and to serve as interface between the host computer and the physical storage media. Given the critical role played by the storage controller with respect to computer system I/O performance, it is desirable to minimize the potential for interrupted I/O service due to storage controller malfunction. Thus, prior workers in the art have developed various system design approaches in an attempt to achieve some degree of fault tolerance in the storage control function. One such prior approach requires that all system functions be "mirrored". While this type of approach is most effective in reducing interruption of I/O operations and lends itself to value-added fault isolation techniques, it has previously been costly to implement and heretofore has placed a heavy processing burden on the host computer.

One prior method of providing storage system fault tolerance accomplishes failover through the use of two controllers coupled in an active/passive configuration. During failover, the passive controller takes over for the active (failing) controller. A drawback to this type of dual configuration is that it cannot support load balancing, as only one controller is active and thus utilized at any given time, to increase overall system performance. Furthermore, the passive controller presents an inefficient use of system resources.

Another approach to storage controller fault tolerance is based on a process called 'failover'. Failover is known in the art as a process by which a first storage controller, coupled to a second controller, assumes the responsibilities of the second controller when the second controller fails. 'Failback' is the reverse operation, wherein the second controller, having been either repaired or replaced, recovers control over its originally-attached storage devices. Since each controller is capable of accessing the storage devices attached to the other controller as a result of the failover, there is no need to store and maintain a duplicate copy of the data, i.e., one set stored on the first controller's attached devices and a second (redundant) copy on the second controller's devices.

U.S. Pat. No. 5,274,645 (Dec. 28, 1993), to Idleman et al. discloses a dual-active configuration of storage controllers capable of performing failover without the direct involvement of the host. However, the direction taken by Idleman requires a multi-level storage controller implementation. Each controller in the dual-redundant pair includes a two-level hierarchy of controllers. When the first level or host-interface controller of the first controller detects the failure of the second level or device interface controller of the second controller, it re-configures the data path such that the data is directed to the functioning second level controller of the second controller. In conjunction, a switching circuit re-configures the controller-device interconnections, thereby permitting the host to access the storage devices originally connected to the failed second level controller through the operating second level controller of the second controller. Thus, the presence of the first level controllers serves to isolate the host computer from the failover operation, but this isolation is obtained at added controller cost and complexity.

Other known failover techniques are based on proprietary buses. These techniques utilize existing host interconnect "hand-shaking" protocols, whereby the host and controller act in cooperative effort to effect a failover operation. Unfortunately, the "hooks" for this and other types of host-assisted failover mechanisms are not compatible with more recently developed, industry-standard interconnection protocols, such as SCSI, which were not developed with failover capability in mind. Consequently, support for dual-active failover in these proprietary bus techniques must be built into the host firmware via the host device drivers. Because SCSI, for example, is a popular industry standard interconnect, and there is a commercial need to support platforms not using proprietary buses, compatibility with industry standards such as SCSI is essential. Therefore, a vendor-unique device driver in the host is not a desirable option.

U.S. patent application Ser. No. 08/071,710 to Sicola et al., describes a dual-active, redundant storage controller configuration in which each storage controller communicates directly with the host and its own attached devices, the access of which is shared with the other controller. Thus, a failover operation may be executed by one of the storage controller without the assistance of an intermediary controller and without the physical reconfiguration of the data path at the device interface.

However, none of the above references disclose a system having a remote backup site connected to a host site via a dual fabric link, where the system provides a mechanism for grouping logical units for logging and failover purposes. Furthermore, the prior technology does not provide for proper ordering of I/O operations during logging across multiple volumes.

Therefore, there is a clearly felt need in the art for a disaster tolerant data storage system capable of associating a group of logical units so that they share a set of properties which provides in-order operations during transaction logging and merge-back as well as failure consistency across the associated units.

SOLUTION TO THE PROBLEM

Accordingly, the above problems are solved, and an advance in the field is accomplished by the system of the present invention which provides a completely redundant configuration including dual Fibre Channel fabric links interconnecting each of the components of two data storage sites, wherein each site comprises a host computer and associated data storage array, with redundant array controllers and adapters. The present system is unique in that each array controller is capable of performing all of the data replication functions, and each host 'sees' remote data as if it were local. The array controllers also perform a command and data logging function which stores all host write commands and data 'missed' by the backup storage array during a situation wherein the links between the sites are down, the remote site is down, or where a site failover to the remote site has occurred.

The present system includes an additional novel aspect of grouping logical units, into 'association sets', for logging and failover purposes. The concept of association sets allows the present system provides for proper ordering of I/O operations during logging across multiple volumes. In addition, association sets are employed by the present invention to provide failure consistency by causing the group of logical units/volumes to all fail at the same time, ensuring a point in time consistency on the remote site.

The 'mirroring' of data for backup purposes is the basis for RAID ('Redundant Array of Independent [or Inexpensive] Disks') Level 1 systems, wherein all data is replicated on N separate disks, with N usually having a value of 2. Although the concept of storing copies of data at a long distance from each other (i.e., long distance mirroring) is known, the use of a switched, dual-fabric, Fibre Channel configuration as described herein is a novel approach to disaster tolerant storage systems. Mirroring requires that the data be consistent across all volumes. In prior art systems which use host-based mirroring (where each host computer sees multiple units), the host maintains consistency across the units. For those systems which employ controller-based mirroring (where the host computer sees only a single unit), the host is not signaled completion of a command until the controller has updated all pertinent volumes. The present invention is, in one aspect, distinguished over the previous two types of systems in that the host computer may associate multiple volumes, but the data replication function is performed by the controller. Therefore, a mechanism is required to communicate the host required association between volumes to the controller. To maintain this consistency between volumes, the system of the present invention provides a mechanism of associating a set of volumes to synchronize the logging to the set of volumes so that when the log is consistent when it is "played back" to the remote site.

Each array controller in the present system has a dedicated link via a fabric to a partner on the remote side of the long-distance link between fabric elements. Each dedicated link does not appear to any host as an available link to them for data access, however, it is visible to the partner array controllers involved in data replication operations. These links are managed by each partner array controller as if being 'clustered' with a reliable data link between them.

The fabrics comprise two components, a local element and a remote element. An important aspect of the present invention is the fact that the fabrics are 'extended' by standard e-ports (extension ports). The use of e-ports allow for standard Fibre Channel cable to be run between the fabric elements or the use of a conversion box to covert the data to a form such as telco ATM or IP. The extended fabric allows the entire system to be viewable by both the hosts and storage.

The dual fabrics, as well as the dual array controllers, dual adapters in hosts, and dual links between fabrics, provide high-availability and present no single point of failure. A distinction here over the prior art is that previous systems typically use other kinds of links to provide the data replication, resulting in the storage not being readily exposed to hosts on both sides of a link. The present configuration allows for extended clustering where local and remote site hosts are actually sharing data across the link from one or more storage subsystems with dual array controllers within each subsystem.

The present system is further distinguished over the prior art by other additional features, including independent discovery of initiator to target system and automatic rediscovery after link failure. In addition, device failures, such as controller and link failures, are detected by 'heartbeat' monitoring by each array controller. Furthermore, no special host software is required to implement the above features because all replication functionality is totally self contained within each array controller and automatically done without user intervention.

An additional aspect of the present system is the ability to function over two links simultaneously with data replication traffic. If failure of a link occurs, as detected by the 'initiator' array controller, that array controller will automatically 'failover', or move the base of data replication operations to its partner controller. At this time, ail transfers in flight are discarded, and therefore discarded to the host. The host simply sees a controller failover at the host OS (operating system) level, causing the OS to retry the operations to the partner controller. The array controller partner continues all 'initiator' operations from that point forward. The array controller whose link failed will continuously watch that status of its link to the same controller on the other 'far' side of the link. That status changes to a 'good' link when the array controllers have established reliable communications between each other. When this occurs, the array controller 'initiator' partner will 'failback' the link, moving operations back to newly reliable link. This procedure re-establishes load balance for data replication operations automatically, without requiring additional features in the array controller or host beyond what is minimally required to allow controller failover.

Because the present system provides grouping logical units, into 'association sets', the system provides for proper ordering of I/O operations during logging across multiple volumes. A further benefit of association sets is providing failure consistency across the logical unit group to ensure that all the volumes fail if one member fails, so that the remote site will have a consistent view of the data up to the point of failure.

BRIEF DESCRIPTION OF THE DRAWINGS

The above objects, features and advantages of the present invention will become more apparent from the following detailed description taken in conjunction with the accompanying drawings, in which.

DETAILED DESCRIPTION

The system of the present invention comprises a data backup and remote copy system which provides disaster tolerance. The present system advantageously utilizes a novel concept of grouping of logical units called association sets. Association sets are used by a host computer to keep multiple units consistent with each other. More specifically, an association set is a group of one more remote copy sets on a local or remote pair of array controllers with attributes for logging and failover that are selectable by a system user. Members of the group share a set of properties for (1) log efficiency—logging to the same log container for space efficiency; (2) In-order guarantees—logging all transactions in order received to multiple logical units simultaneously; and (3) failure consistency—if one volume hits an unrecoverable data error, the group of logical units/volumes can be forced to all fail at the same time, ensuring a point in time consistency on the remote site.

In addition, the present system provides a peer-to-peer remote copy (backup) function which is implemented as a controller-based replication of one or more LUNs (logical units) between two remotely separated pairs of array controllers connected by redundant links. The present system further provides a data logging mechanism (a write history 'log unit') for storing commands and data for every transaction that occurs in the situation where the remote backup storage device is unavailable because both links have failed, a remote site is down, or because of a site failover. The system performs an in-order merging of the log unit data with the data on the previously unavailable backup device to quickly return both local and remote sites to the same data state after link restoration or remote site restoration.

Figure 1:
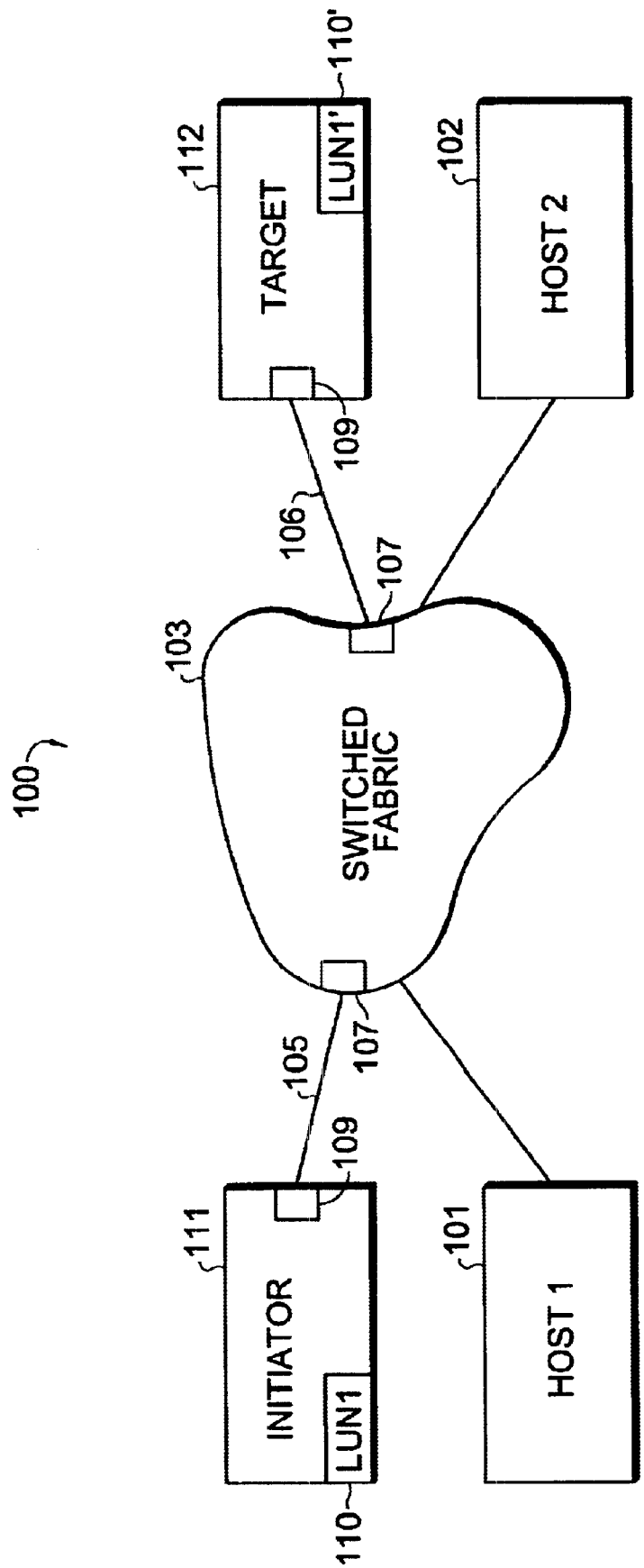
FIG. 1 is a diagram showing long distance mirroring.

FIG. 1 is a diagram showing long distance mirroring, which is an underlying concept of the present invention. The present system 100 employs a switched, dual-fabric, Fibre Channel configuration to provide a disaster tolerant storage system. Fibre Channel is the general name of an integrated set of standards developed by the American National Standards Institute (ANSI) which defines protocols for information transfer. Fibre Channel supports multiple physical interface types, multiple protocols over a common physical interface, and a means for interconnecting various interface types. A 'Fibre Channel' may include transmission media such as copper coax or twisted pair copper wires in addition to (or in lieu of) optical fiber.

As shown in FIG. 1, when host computer 101 writes data to its local storage array, an initiating node, or 'initiator' 111 sends a backup copy of the data to remote 'target' node 112 via a Fibre Channel switched fabric 103. A 'fabric' is a topology (explained in more detail below) which supports dynamic interconnections between nodes through ports connected to the fabric. In FIG. 1, nodes 111 and 112 are connected to respective links 105 and 106 via ports 109. A node is simply a device which has at least one port to provide access external to the device. In the context of the present system 100, a node typically includes an array controller pair and associated storage array. Each port in a node is generically termed an N (or NL) port. Ports 109 (array controller ports) are thus N ports. Each port in a fabric is generically termed an F (or FL) port. In FIG. 1, links 105 and 106 are connected to switched fabric 103 via F ports 107. More specifically, these F ports may be E ports (extension ports) or E port/FC-BBport pairs, as explained below.

In general, it is possible for any node connected to a fabric to communicate with any other node connected to other F ports of the fabric, using services provided by the fabric. In a fabric topology, all routing of data frames is performed by the fabric, rather than by the ports. This any-to-any connection service ('peer-to-peer' service) provided by a fabric is integral to a Fibre Channel system. It should be noted that in the context of the present system, although a second host computer 102 is shown (at the target site) in FIG. 1, this computer is not necessary for operation of the system 100 as described herein.

An underlying operational concept employed by the present system 100 is the pairing of volumes (or LUNs) on a local array with those on a remote array. The combination of volumes is called a 'remote copy set'. A remote copy set thus consists of two volumes, one on the local array, and one on the remote array. For example, as shown in FIG. 1, a remote copy set might consist of LUN 1(110) on a storage array at site 101 and LUN 1'(110') on a storage array at site 102. The array designated as the 'local' array is called the initiator, while the remote array is called the target. Various methods for synchronizing the data between the local and remote array are possible in the context of the present system. These synchronization methods range from full synchronous to fully asynchronous data transmission, as explained below. The system user's ability to choose these methods provides the user with the capability to vary system reliability with respect to potential disasters and the recovery after such a disaster. The present system allows choices to be made by the user based on factors which include likelihood of disasters and the critical nature of the user's data.

System Architecture

Figure 2:
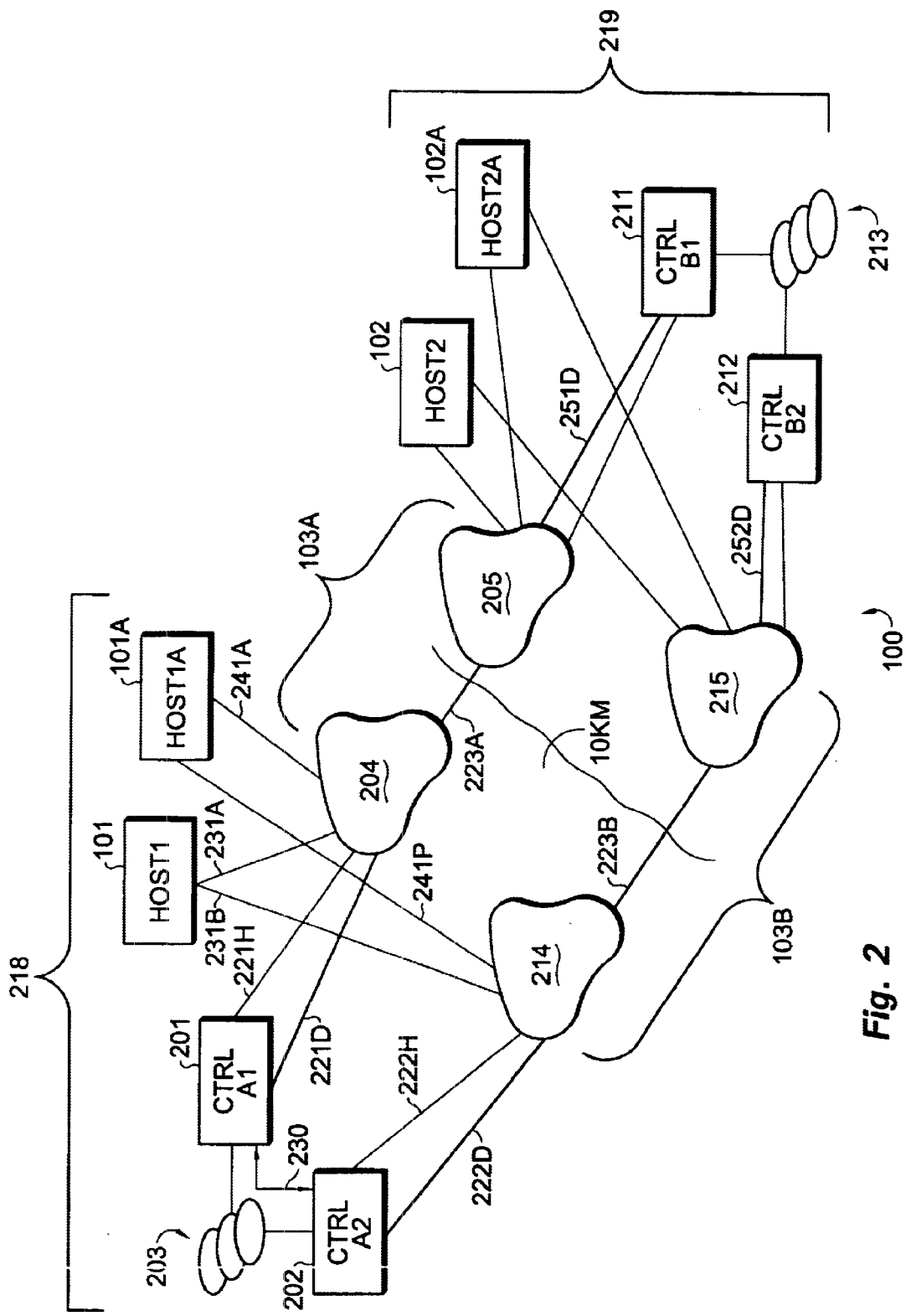
FIG. 2 illustrates a switched dual fabric, disaster-tolerant storage system.

FIG. 2 illustrates an exemplary configuration of the present invention, which comprises a switched dual fabric, disaster-tolerant storage system 100. The basic topology of the present system 100 is that of a switched-based Storage Area Network (SAN). As shown in FIG. 2, data storage sites 218 and 219 each respectively comprise two hosts 101/101A and 102/102A, and two storage array controllers 201/202 and 211/212 connected to storage arrays 203 and 213, respectively. Alternatively, only a single host 101/102, or more than two hosts may be connected to system 100 at each site 218/219. Storage arrays 203 and 213 typically comprise a plurality of magnetic disk storage devices, but could also include or consist of other types of mass storage devices such as semiconductor memory.

In the configuration of FIG. 2, each host at a particular site is connected to both fabric elements (i.e., switches) located at that particular site. More specifically, at site 218, host 101 is connected to switches 204 and 214 via respective paths 231A and 231B; host 101A is connected to the switches via paths 241A and 241B. Also located at site 218 are array controllers A1 (ref. no. 201 and A2 (ref. no. 202). Array controller A1 is connected to switch 204 via paths 221H and 221D; array controller A2 is connected to switch 214 via paths 222H and 222D. The path suffixes 'H' and 'D' refer to 'Host' and 'Disaster-tolerant' paths, respectively, as explained below. Site 219 has counterpart array controllers B1 (ref. no 211) and B2 (ref. no. 212), each of which is connected to switches 205 and 215. Note that array controllers B1 and B2 are connected to switches 205 and 215 via paths 251D and 252D, which are, in effect, continuations of paths 221D and 222D, respectively.

In the present system shown in FIG. 2, all storage subsystems (201/202/203 and 211/212/213) and all hosts (101, 101A, 102, and 102A) are visible to each other over the SAN 103A/103B. This configuration provides for high availability with a dual fabric, dual host, and dual storage topology, where a single fabric, host, or storage can fail and the system can still continue to access other system components via the SAN. As shown in FIG. 2, each fabric 103A/103B employed by the present system 100 includes two switches interconnected by a high-speed link. More specifically, fabric 103A comprises switches 204 and 205 connected by link 223A, while fabric 103B comprises switches 214 and 215 connected by link 223B.

Basic Fibre Channel technology allows the length of links 223A/223B (i.e., the distance between data storage sites) to be as great as 10 KM as per the FC-PH3 specification (see Fibre Channel Standard: Fibre Channel Physical and Signaling Interface, ANSII X3T11). However, distances of 20 KM and greater are possible given improved technology and FC-PH margins with basic Fibre Channel. FC-BB (Fibre Channel Backbone) technology provides the opportunity to extend Fibre Channel over leased Telco lines (also called WAN tunneling). In the case wherein FC-BB is used for links 223A and 223B, FC-BB ports are attached to the E ports to terminate the ends of links 223A and 223B.

It is also possible to interconnect each switch pair 204/205 and 214/215 via an Internet link (223A/223B). If the redundant links 223A and 223B between the data storage sites 218/219 are connected to different ISPs (Internet Service Providers) at the same site, for example, there is a high probability of having at least one link operational at any given time. This is particularly true because of the many redundant paths which are available over the Internet between ISPs. For example, switches 204 and 214 could be connected to separate ISPs, and switches 205 and 215 could also be connected to separate ISPs.

Figure 3:
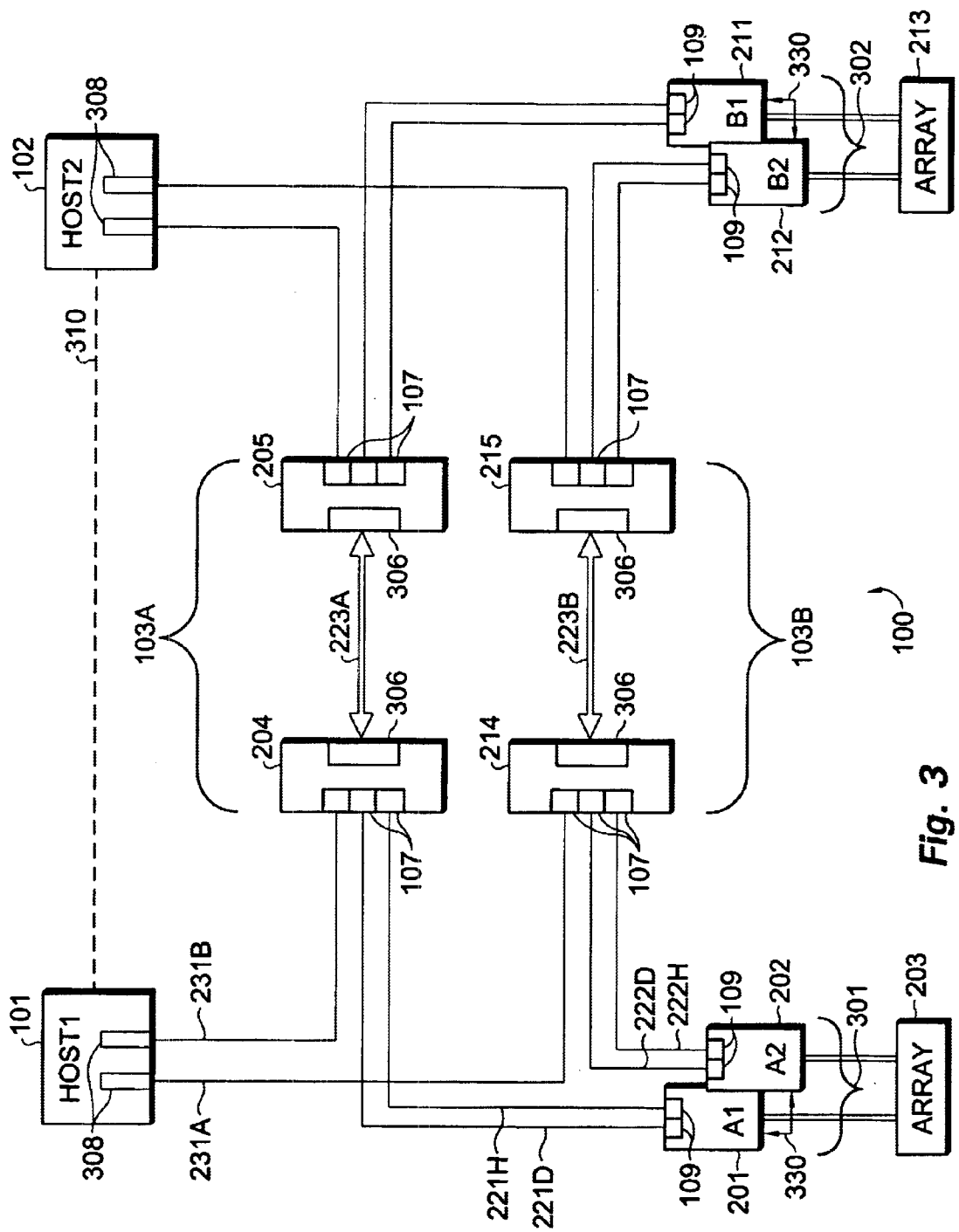
FIG. 3 is a block diagram of the system shown in FIG. 2.

FIG. 3 is an exemplary block diagram illustrating additional details of the system shown in FIG. 2. The configuration of the present system 100, as shown in FIG. 3, depicts only one host per site for the sake of simplicity. Each host 101/102 has two adapters 308 which support the dual fabric topology. The hosts typically run multi-pathing software (known in the art) that dynamically allows failover between storage paths as well as static load balancing of storage volumes (LUNs) between the paths to the controller-based storage arrays 201/202 and 211/212. The configuration of system 100 allows for applications using either of the storage arrays 203/213 to continue running given any failure of either fabric 103A/103B or either of the storage arrays.

The array controllers 201/202 and 211/212 employed by the present system 100 have two host ports 109 per array controller, for a total of four connections (ports) per pair in the dual redundant configuration of FIG. 3. Each host port 109 preferably has an optical attachment to the switched fabric, for example, a Gigabit Link Module ('GLM') interface at the controller, which connects to a Gigabit Converter ('GBIC') module comprising the switch interface port 107. Switch interconnection ports 306 also preferably comprise GBIC modules. Each pair of array controllers 201/202 and 211/212 (and associated storage array) is also called a storage node (e.g., 301 and 302), and has a unique Fibre Channel Node Identifier. As shown in FIG. 3, array controller pair A1/A2 comprise storage node 301, and array controller pair B1/B2 comprise storage node 302. Furthermore, each storage node and each port on the array controller has a unique Fibre Channel Port Identifier, such as a World-Wide ID (WWID). In addition, each unit connected to a given array controller also has a WWID, which is the storage node's WWID with an incrementing 'incarnation' number. This WWID is used by the host's O/S to allow the local and remote units to be viewed as the 'same' storage.

The array controllers' ports 109 are connected somewhat differently than typical dual controller/adapter/channel configurations. Normally, the controller ports' connections to dual transmission channels are cross-coupled, i.e., each controller is connected to both channels. However, in the present system configuration 100, both ports on array controller A1, for example, attach directly to a single fabric via switch 204. Likewise, both ports on array controller A2 attach directly to the alternate fabric, via switch 214. The exact same relative connections exist between array controllers B1/B2 and their respective switches 205/215 and associated fabrics. One port of each controller is the 'host' port that will serve LUN(s) to the local host 101/102. The other port of each controller is the 'remote copy' port, used for disaster tolerant backup.

Remote Copy Sets

Figure 4:
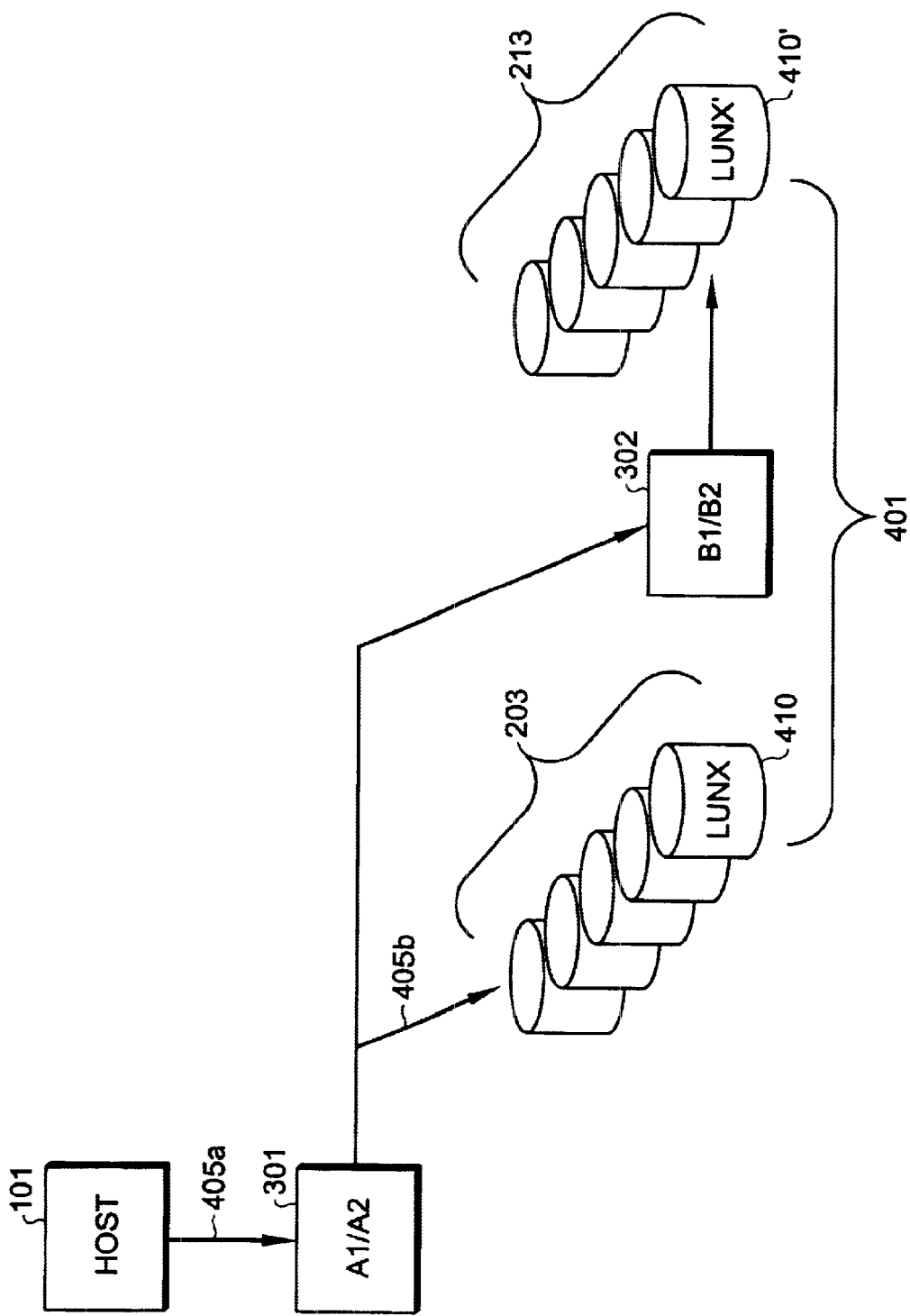
FIG. 4 is a high-level diagram of a remote copy set operation.

FIG. 4 is a high-level diagram of a 'remote copy set' operation. The present system 100 views volumes (or LUNs) on a local array as being paired with counterpart volumes on a remote array. A remote copy set comprises a pair of same-sized volumes, one on the local array, and one on the remote array. When a local host computer 101, for example, requests a storage array I/O operation, the local array controller, or 'initiator' 301, presents a local volume that is part of the remote copy set to the local host. The host 101 performs writes to the local volume on the local array 203, which copies the incoming write data to the remote volume on the target array 213.

As shown in FIG. 4, two LUNs (logical units), LUN X(410) and LUN X'(410'), attached to controllers B1/B2 (302) and A1/A2 (301), respectively, are bound together as a remote copy set 401. A remote copy set (RCS), when added on array 203, points to array 213, and will cause the contents of the local RCS member on array 203 to be immediately copied to the remote RCS member on array 213. When the copy is complete, LUN X'(410') on array 213 is ready to be used as a backup device. In order to preserve the integrity of the backup copy, local host 101 access to LUN 410' is not allowed during normal operations.

Software Architecture

Figure 5:
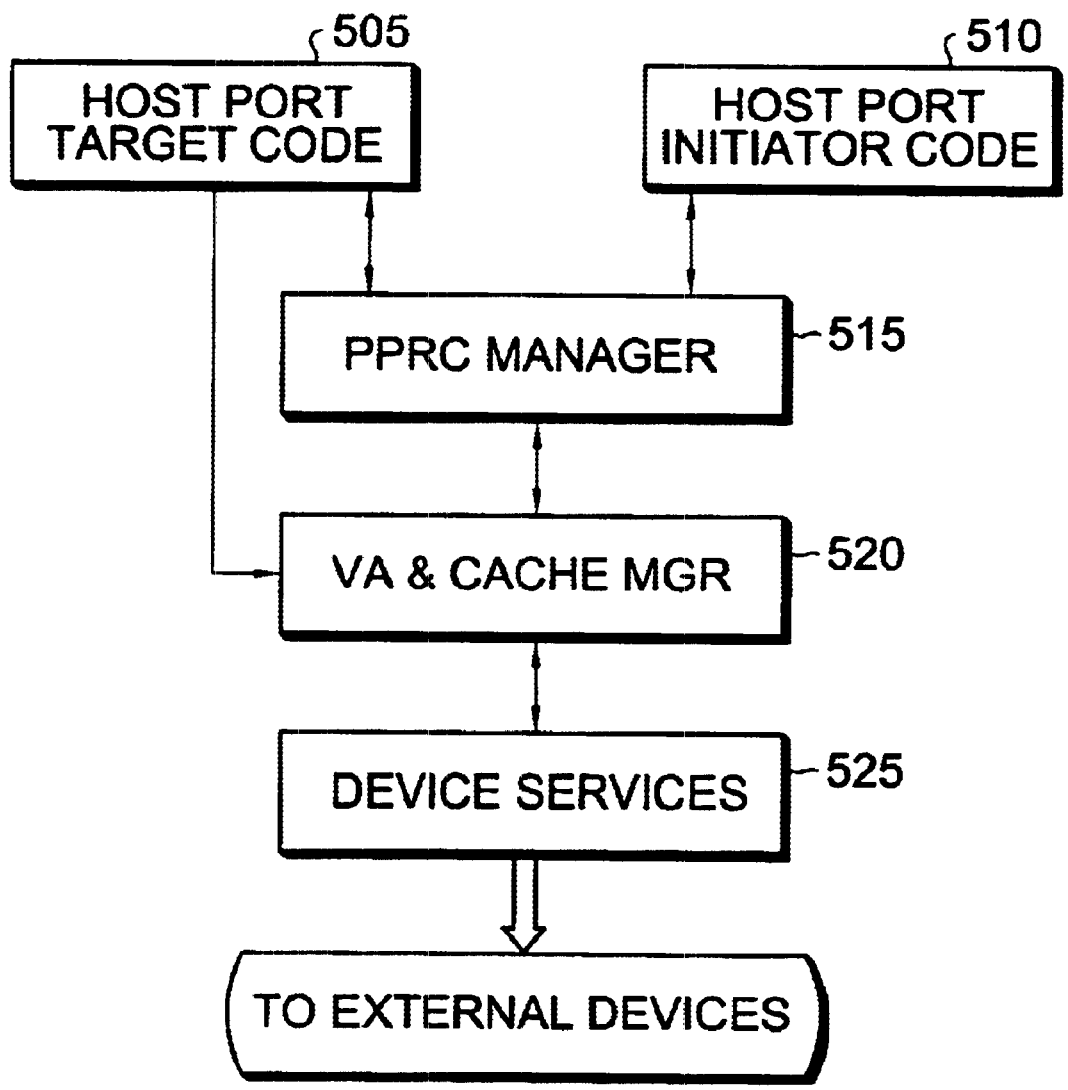
FIG. 5 is a block diagram showing exemplary controller software architecture.

FIG. 5 is a block diagram showing exemplary array controller software architecture employed by the present system 100. As shown in FIG. 5, peer-to-peer remote copy software ('PPRC manager') 515 is layered in between host port initiator module 510 and VA ('Value Added', such as RAID and caching) software module 520 within each controller (A1/A2/B1/B2). VA layer 520 is not aware of any PPRC manager 515 context (state change or transfer path). Host port target code 505 allows only host initiators to connect to the controller port which is a dedicated data replication port.

The PPRC manager module 515 uses containers and services that the VA layer 520 exports. PPRC manager 515 uses interfaces between host port initiator module 510 and VA module 520 for signaling, transfer initiation, and transfer completions. PPRC manager 515 is responsible for managing functions including initiating the connection and heartbeat with the remote controller and initiating the remote copy for incoming host writes (via host port initiator 510); initiating I/O operations for performing full copy, log, and merge; handling error recovery (link failover) and peer communication; and maintaining state information. Device Services layer 525 handles the physical I/O to external devices including the local data storage array and switch.

Inter-Site Controller Heartbeat Timer Operation

Figure 6A:
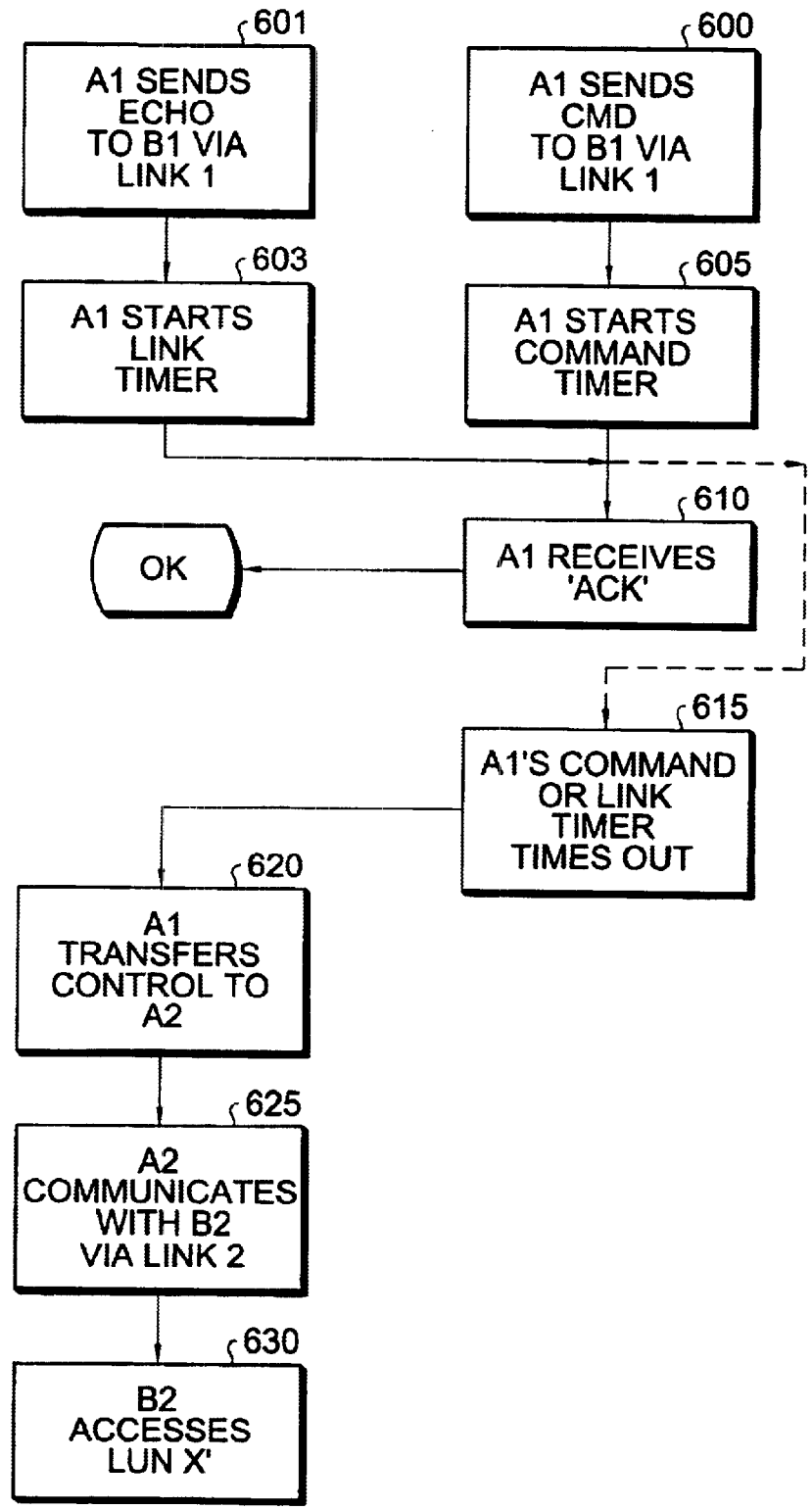
FIG. 6A is a flow diagram showing inter-site controller heartbeat timer operation.

FIG. 6A is an exemplary flow diagram showing the operation of two of the array controller 'heartbeat' timers. The operation described in FIG. 6A is best understood in conjunction with reference to the system architecture shown in FIGS. 2 and 3. In the embodiment described in FIG. 6A, during the course of normal system operation, host computer 101 sends requests to write data to array 203 via controller A1 (201). At step 600, in response to a write request, array controller A1 sends a write command and the host write data to target array controller B1 via fabric 103A (referred to as 'link 1" in FIG. 6), so that the data is backed up on array 213. At step 605, controller A1 starts a command ('heartbeat') timer which keeps track of the time between issuance of the write command and a response from the target controller B1. If link 1 and controller B1 are operational, then controller B1 writes the data to array 213 and, at step 610, sends an acknowledgement ('ACK') back to controller A1 via link 1, indicating successful completion of the command.

Asynchronously with respect to the command timer described above, at step 601, controller A1 may also periodically send a Fibre Channel 'echo' extended link service command to controller B1 via link 1. In one embodiment of the present system, the link echo is sent every 10 seconds; however, the exact frequency of the echoes is not critical, nor is it necessary to have the echoes synchronized with any specific source. At step 603, controller A1 sets a second 'heartbeat' timer or counter, which can simply be a counter which counts-down using a clock to keep track of the time elapsed since the sending of the link echo. At step 610, in the normal course of operation, controller A1 receives an 'ACK' from controller B1, indicating that link 1 is operational. The command and link timers are preferably set to time out at intervals which are best suited for the cross-link response time between controllers A1 and B1. It is to be noted that a single inter-site link/command timer may be employed in lieu of the two timers described above. A periodic 'echo' and associated timer may entirely supplant the command timer, or, alternatively, the echo timer may be replaced by the use of a single timer to ensure that each command sent over each inter-site link is responded to within a predetermined time.

At step 615, due to a failure of link 1 or controller B1, at least one of two situations has occurred—(1) controller A1's command timer has timed out, or (2) controller A1's link timer has timed out. In either event, a link failover operation is initiated. At step 620, controller A1 transfers control to controller A2, causing A2 to assume control of backup activities. Next, at step 625, controller A2 proceeds to back up data on storage array 213 by communicating with controller B2 via link 2 (fabric 103B). Since controller B2 shares storage array 213 with controller B1, at step 630, B2 now has access to the volume (e.g., LUN X') which was previously created by controller B1 with data sent from controller A1. The failover process is further described below with respect to FIG. 6B.

Intra-Site Controller Heartbeat Timer Operation

Figure 6B:
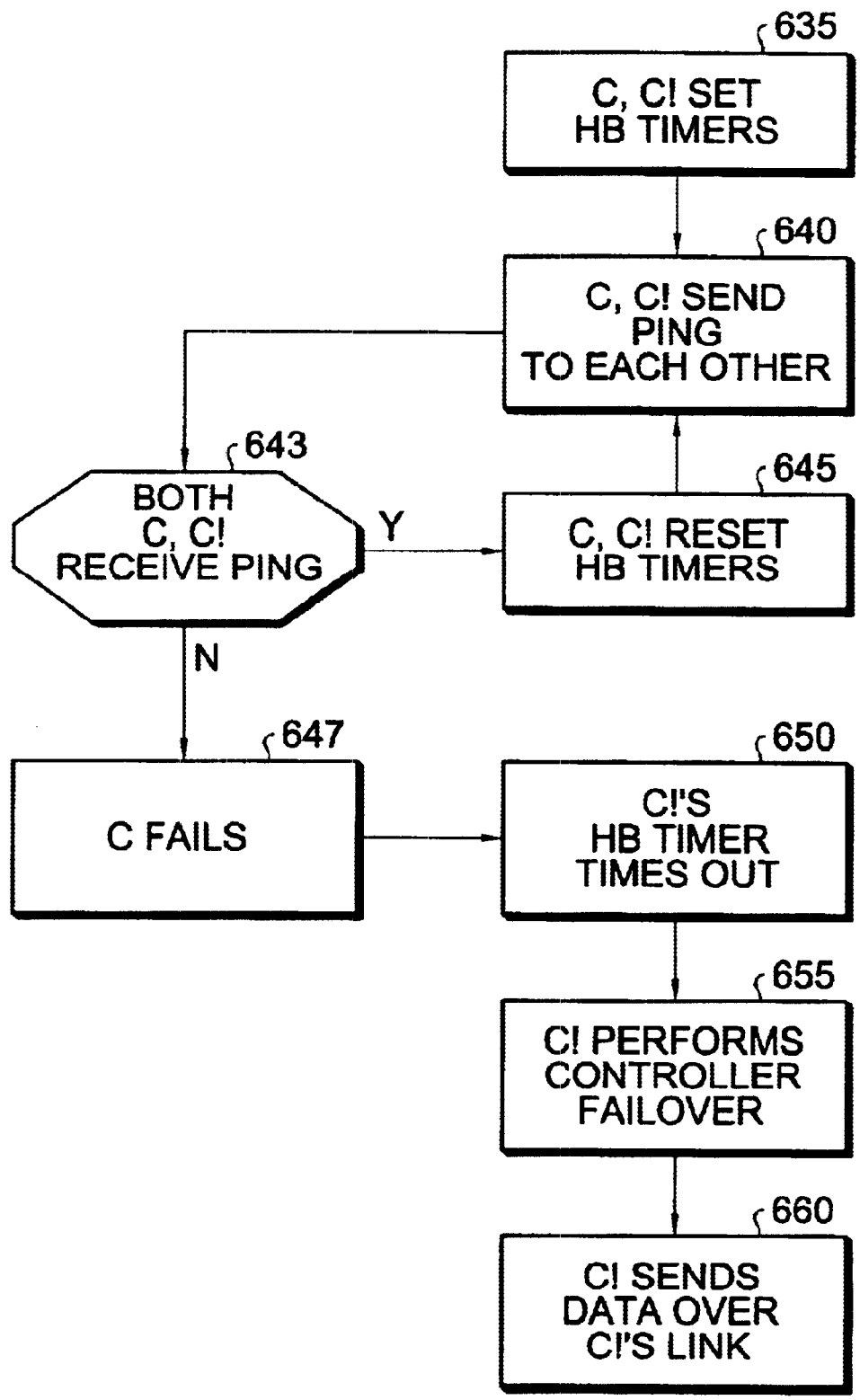
FIG. 6B is a flow diagram showing intra-site controller heartbeat timer operation.

FIG. 6B is a flow diagram showing the operation of controller-based 'heartbeat' timers, wherein a controller failover operation is effected by a 'surviving' controller. In the example illustrated in FIG. 6B, controllers A1 (201) and A2 (202) are interchangeably represented by the letters 'C' and 'C!', where "C!" represents C's 'companion' controller, i.e., where controller C can be either controller A1 or A2, and controller C! is the companion controller A2 or A1, respectively. This terminology is chosen to illustrate the symmetrical relationship between the two controllers. In the present example, the data from host computer 101 is sent over C's link (e.g., link 1) to a backup volume (e.g., LUN X) via its counterpart controller (e.g., controller B1) at the remote target site.

Initially, at step 635, controllers C and C! set a 'controller heartbeat' timer or counter to keep track of the time elapsed between receiving consecutive heartbeat signals (hereinafter referred to as 'pings') from the other controller. The controller heartbeat timer is set to time out at a predetermined interval, which allows for a .worst-case elapsed time between receiving two consecutive pings from the other controller. Next, during normal operation, at step 640, controllers C and C! periodically send pings to each other via DUARTs (Dual Asynchronous Receiver/Transmitters) located at both ends of bus 330. Assuming that neither controller C nor controller C!'s heartbeat timer has timed out, at step 643, both controllers C and C! receive a ping from their companion controller. Both controllers then reset their heartbeat timers at step 645, and each controller awaits another ping from its companion controller.

In the situation where, for example, controller C fails (step 647), allowing controller C!'s heartbeat timer to time out (at step 650), then, at step 655, controller C! initiates a controller failover operation to move the target LUN on remote storage array to the other controller (e.g., from controller B1 to controller B2). At step 660, controller C! proceeds by sending backup data to alternate controller (e.g., controller B2) via the alternate link (e.g., link 2). At this point, controller C! has access to the backup volume (e.g., LUN X') on array 213.

Connection Setup

When a remote copy set is bound, connection setup is initiated. In a switched Fibre Channel environment, an initiator controller's host port initiator module 510 (FIG. 5) performs discovery to 'find' the target controller. The host port module 510 must use the Fabric's FC-NameServer in order to find controllers which are part of the present system 100. Initially, the user specifies a "target name" which uniquely identifies the remote controller and unit. Once the connection has been setup, a full copy from the initiator unit to the target unit is initiated. The target's data is protected from host access, by the user pre-setting access IDs.

Steady State Operation

Steady state operation of the present system 100 is possible in two modes, synchronous or asynchronous. When the present system is in synchronous mode, the remote data is consistent with the local data. All commands that are returned to the host as completed, are completed on both the initiator and the target. When system 100 is in asynchronous mode, the remote site may lag behind by a bounded number of write I/O operations. All commands that are returned to the host as completed, are completed on the initiator, and may or may not be completed on the target. From a recovery viewpoint the only difference between the operation modes is the level of currency of target members.

Synchronous System Operation

Figure 7:
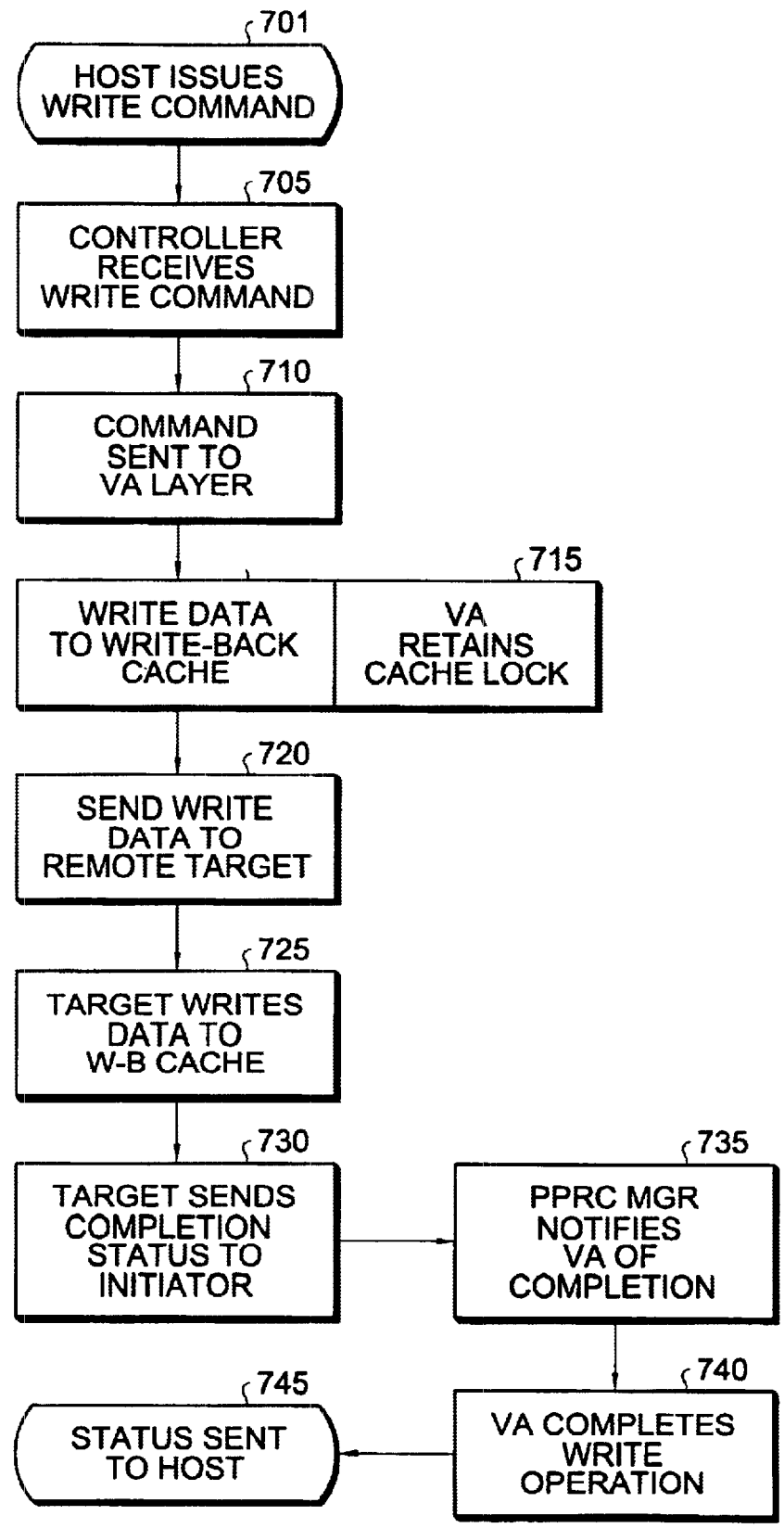
FIG. 7 is a flowchart showing synchronous system operation.

FIG. 7 is a flowchart showing synchronous system operation. In synchronous operation mode, data is written simultaneously to local controller cache memory (or directly to local media if the write request is a write-through command), as well as to the remote subsystems, in real time, before the application I/O is completed, thus ensuring the highest possible data consistency. Synchronous replication is appropriate when this exact consistency is critical to an application such as a banking transaction. A drawback to synchronous operation is that long distances between sites mean longer response times, due to the transit time, which might reach unacceptable latency levels, although this situation is somewhat mitigated by write-back cache at the target. Asynchronous operation, described in the following section, may improve the response time for long-distance backup situations.

Steady state synchronous operation of system 100 proceeds with the following sequence. As shown in FIG. 7, at step 701, host computer 101 issues a write command to local controller A1 (201), which receives the command at host port 109 over path 221*h* at step 705. At step 710, the controller passes the write command down to the VA level software 530 (FIG. 5) as a normal write. At step 715, VA 530 writes the data into its write-back cache through the normal cache manager path (i.e., through the device services layer 525). On write completion, VA 530 retains the cache lock and calls the PPRC manager 515. At step 720, PPRC manager 515 sends the write data to remote target controller B1 (211) via host port initiator module 510. The data is sent through the remote copy dedicated host port 109 via path 221D, and across fabric 103A. Next, at step 725, remote target controller B1 writes data to its write-back cache (or directly to media if a write through operation). Then, at step 730, controller B1 sends the completion status back to initiator controller A1. Once PPRC manager 515 in controller A1 has received a completion status from target controller, it notifies VA 530 of the completion, at step 735. At step 740, VA 530 completes the write in the normal path (media write if write through), releases the cache lock, and completes the present operation at step 745 by sending a completion status to the host 101. The cache lock is released by the last entity to use the data. In the case of a remote write, the cache is released by the PPRC manager upon write completion.

Asynchronous System Operation

Figure 8A:
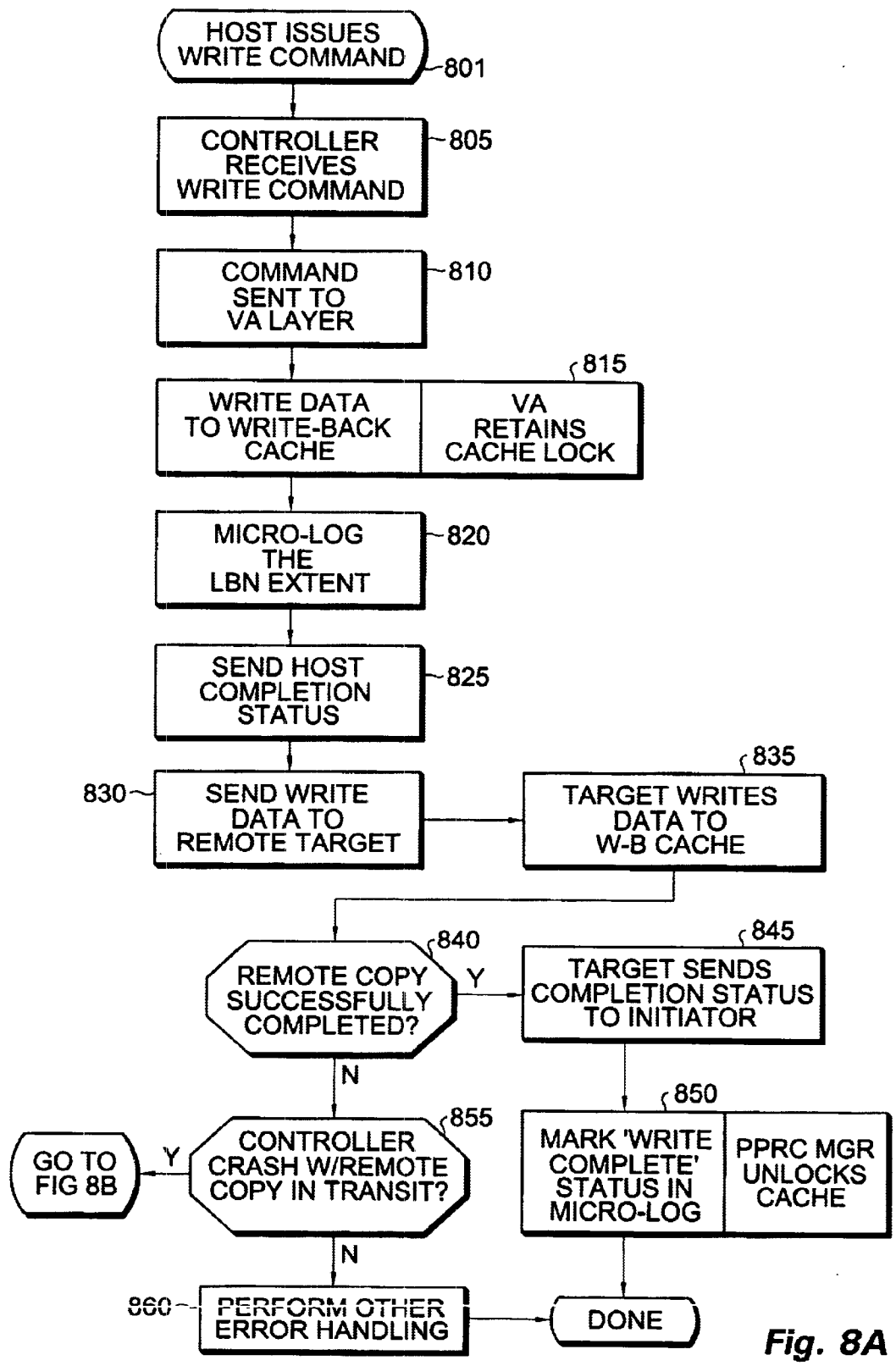
FIG. 8A is a flowchart showing asynchronous system operation.

FIG. 8A is a flowchart showing asynchronous operation the present system 100. Asynchronous operation provides command completion to the host after the data is safe on the initiating controller, and prior to completion of the target command. During system operation, incoming host write requests may exceed the rate at which remote copies to the target can be performed. Copies therefore can be temporarily out of synchronization, but over time that data will converge to the same at all sites. Asynchronous operation is useful when transferring large amounts of data, such as during data center migrations or consolidations.

Asynchronous operation of the present system 100 proceeds with the following sequence. As shown in FIG. 8A, at step 801, host computer 101 issues a write command to local controller A1 (201), which receives the command at host port 109 over path 221*h* at step 805. At step 810, the controller passes the write command down to the VA level software 530 (FIG. 5) as a normal write. At step 815, VA 530 writes the data into its write-back cache through the normal cache manager path (i.e., through the device services layer 525). On write completion, VA 530 retains the cache lock and calls the PPRC manager 515. At step 820, PPRC Manager "micro-logs" the write transfer LBN extent in the controller's non-volatile write-back cache 'micro-log'. This is done in all situations (not just in error situations), in case the initiator controller (A1) crashes after status is returned to the host, but before the remote copy completes. A small reserved area of cache is dedicated for the micro-log.

Micro-logging is done during steady state operation for each asynchronous transfer, not just during error situations. The micro-log information is only used when the controller crashes with outstanding remote copies (or with outstanding logging unit writes). The micro-log contains information to re-issue ('micro-merge') the remote copies by either the 'other' controller (in this example, controller A2) upon controller failover, or when 'this' controller (A1) reboots, in the situation wherein both controllers A1 and A2 are down.

At step 825, PPRC manager 515 calls back VA 530 to complete the host write request, and the host is given the completion status. VA 530 retains the cache lock and Data Descriptor data structure. At step 830, PPRC manager 515 (via host port initiator module 510) sends the write data to the remote target. Order preserving context is also passed to host port initiator module 510. At step 835, remote target controller B1 (211) writes data to its write-back cache (or associated media if a write-through operation). A check is then made by controller A1 at step 840 to determine whether the remote copy successfully completed. If so, then, at step 845, target controller B1 sends the completion status back to initiator controller A1. At step 850, PPRC manager 515 marks the micro-log entry that the write has completed. The PPRC manager also unlocks the controller cache and de-allocates the Data Descriptor.

If, at step 840, if it was determined that the remote copy operation did not complete successfully, then at step 855, if the initiator controller (A1) failed while the remote copy was in transit, then a 'micro-merge' operation (described below with respect to FIG. 8B) is performed. If the remote copy was unsuccessful for other reasons, then at step 860, other error recovery procedures (not part of the present disclosure) are invoked.

Figure 8B:
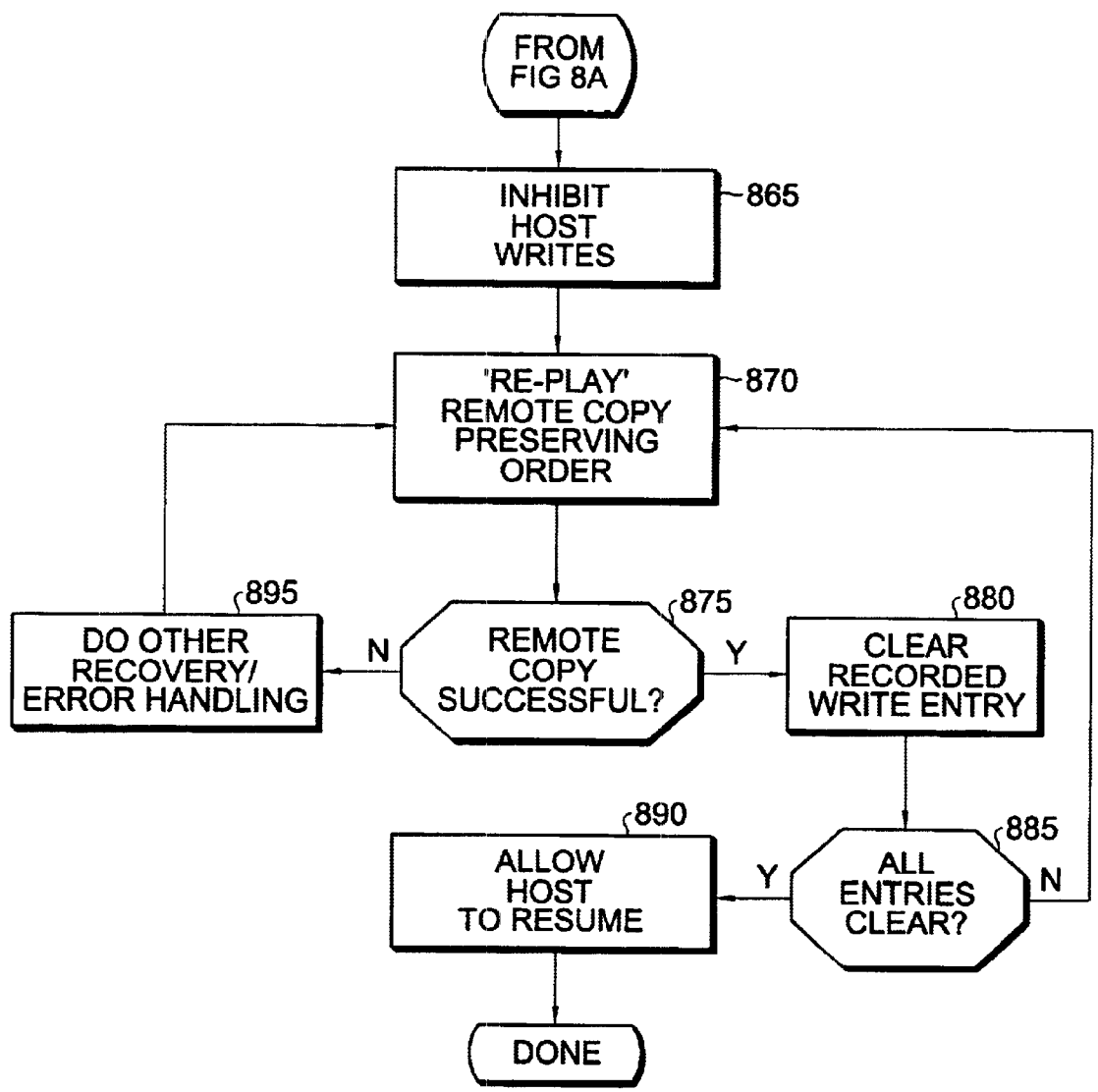
FIG. 8B is a flowchart showing a 'micro-merge' operation.

FIG. 8B is a flowchart showing a 'micro-merge' operation. A micro-merge operation is applicable during asynchronous operation when the controller has failed in the window where the host write status has already been returned to the host, but where the remote copy operation (or write history log operation) has not completed. As indicated above, these 'outstanding' writes were logged to the initiator controller A1's write-back cache which is also mirrored in partner controller A2's (mirrored) write-back cache, so that it is available if controller A1 fails. If a controller failover has taken place (as explained in the next section, below), then the partner controller (A2) re-issues these remote copies from the micro-log. Alternatively, if both controllers A1 and A2 are down, then controller A1 itself re-issues these writes when it restarts.

The following sequence takes place in the controller during micro-merging mode. At step 865, access to the initiator unit by the host is inhibited until the micro-merge is complete. At step 870, for each valid entry in the micro-log in the controller write-back cache, the initiator unit is read at the LBN described. If the read has an FE (forced error), then the FE will be copied to the target (which is highly unlikely, since the area was just written). If the read is unrecoverable, then the target member is removed, because it is impossible to make the target consistent. If the read is successful, the data is then written to the remote target member using the normal remote copy path. Alternatively, if write history logging is active, the data is written to the log unit described below in the 'Write History Logging' section.

In addition to command and LBN extent information, the micro-log contains the command sequence number and additional context to issue the commands in the same order received from the host. At step 875, if the remote copy of the entry was successful, then at step 880, the recorded entry in the micro-log is cleared, and the next entry is 're-played', at step 870. If the remote copy of the entry was not successful, then at step 895, then error recovery procedures (not part of the present disclosure) are invoked. After completing all micro-merges (step 885), the initiator unit is made accessible to the host at step 890.

Link Failover

'Link failover' is recovery at the initiator site when one of the two links has failed. Examples of a link failover situation include a target controller rebooting, a switch failure, or an inter-site link failure. In a first situation, if the initiator controller has two consecutive failed heartbeats and its dual partner has two consecutive successful 'heartbeats', then a link failover is performed. It may also performed in a second situation wherein a remote write has failed due to a link error and its dual partner last had two successful heartbeats (a failed write is held for two successive heartbeats).

Figure 9:
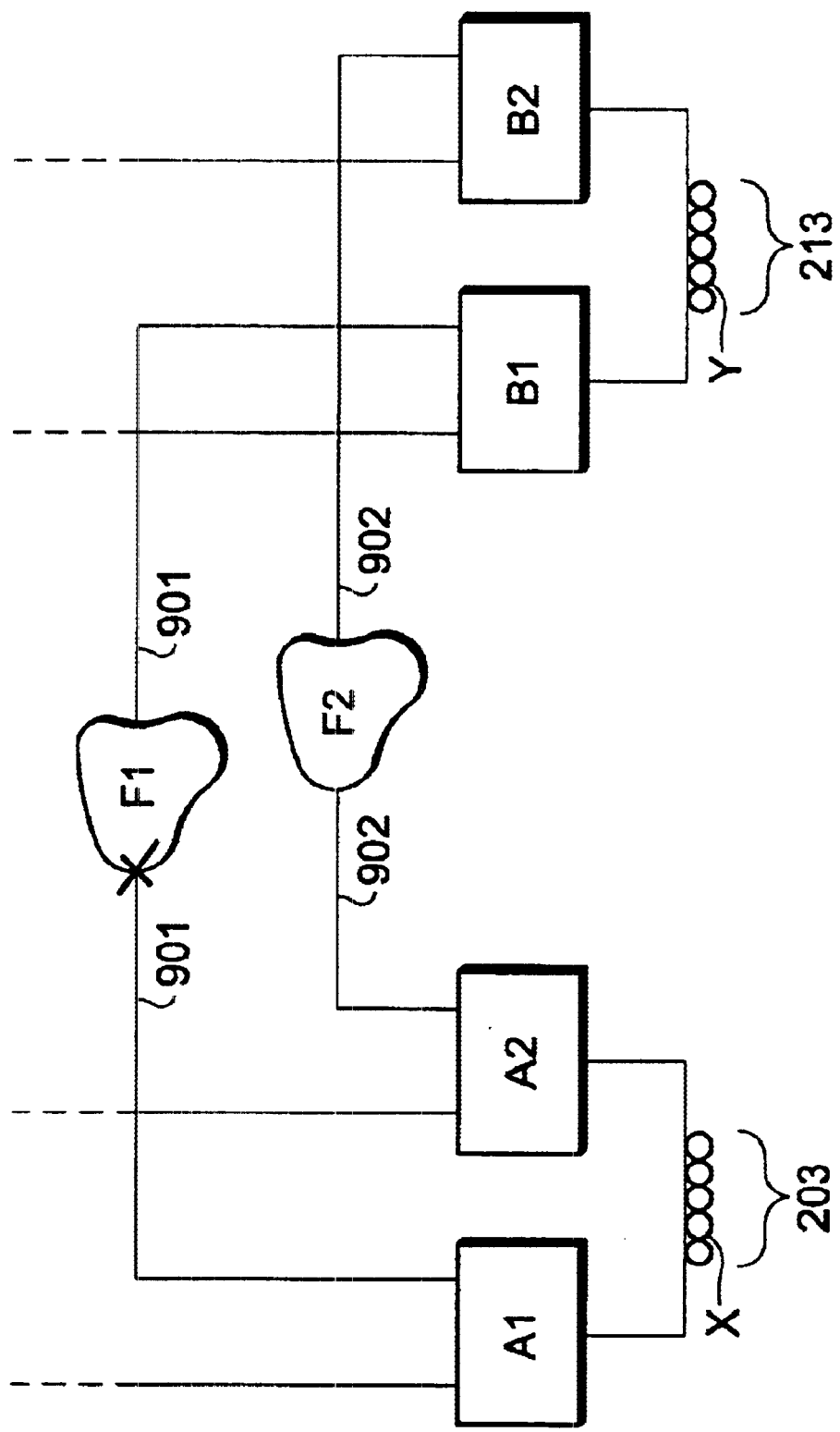
FIG. 9 is a diagram showing an example of a link failover operation.

FIG. 9 is a diagram showing an example of a link failover operation. As shown in FIG. 9, link 901 is lost to initiator controller A1. In the present example, controller A1 is in communication with partner controller A2, which indicates to A1 that A2's link 902 to controller B2 is operational. In this situation, initiator controller A1 attempts link failover recovery procedures by attempting to communicate through its dual redundant partner controller A2 and resume operations. In one embodiment of the present system, a link failover is accomplished by restarting (re-booting) controller A1, to force the initiator unit X on array 203 from controller A1 to its partner controller A2. Once unit X is moved over from controller A1 to controller A2 on the initiator side, controller A2 then 'pulls' target unit Y over to its dual redundant partner B2 where controller A2 (the 'new' initiator) can access it. Link failover is not performed upon receiving SCSI errors (unit failures) from the remote unit, because the other controller will likely encounter the same error. It is to be noted that the initiator controllers (A1 and A2) control the entire failover operation (the target controller, e.g., B2 is the slave).

Operations resume between controllers A2 and B2 if the previous steps were successful. When link failover is successful, the host retries any writes, similar to a controller failover event. Incoming writes during this time are not queued, but rather rejected, so the host will retry them. If the link is restored, the host can move the unit back to the original side. The unit is not moved back automatically by the controller. In other words, there is no "link failback" performed by the controller.

Write History Longing

The present system 100 provides a unique storage set (typically, RAID level 1, level 0+1, or level 5 storage set) that is considered as a logical unit by the associated controller, and which is employed to create a write history (transaction) log comprising log commands and extents, as well as data, during situations where the remote member of a remote copy set ('RCS') is not available. This storage set, called a 'log unit', hereinafter, is subsequently 'replayed', in the exact same order in which it was written, to the remote RCS member to merge the local and remote RCS members. The log unit is preferably located on the same storage array as the local remote copy set member.

Figure 10:
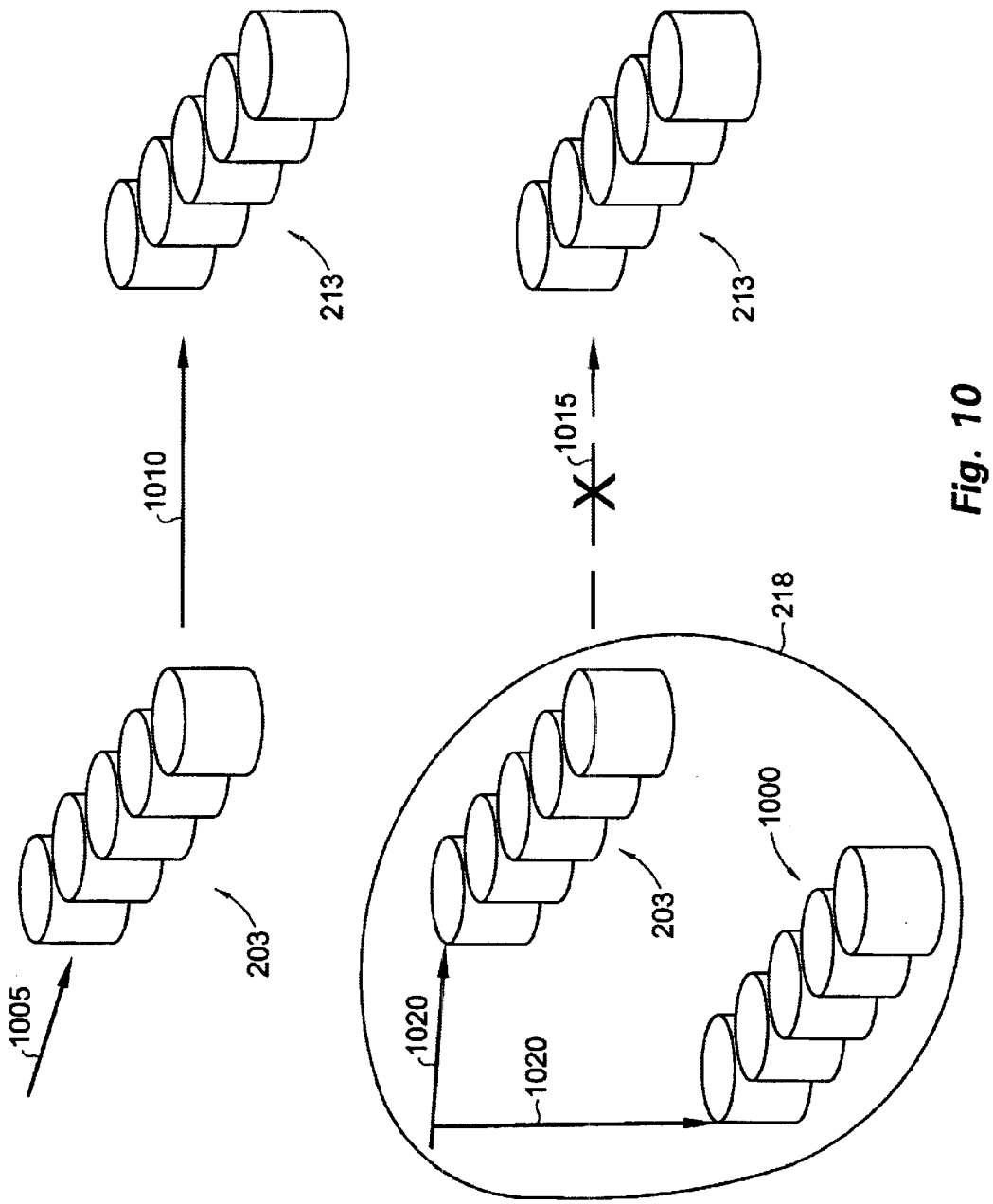
FIG. 10 is a flow diagram showing a log operation when both links are down, or when the remote site is down.

FIG. 10 is a high-level flow diagram showing a write history log operation performed by the present system 100 when both links are down, or when the remote site is down. The top section of FIG. 10 depicts normal operation of the present system 100, where arrow 1005 shows write data from host computer 101 being stored on local (initiator) array 203. Arrow 1010 indicates that the write data is normally backed up on remote (target) array 213. The lower section of FIG. 10 shows system 100 operation when the links between the local and remote sites are down, or when the remote pair of array controllers 211/212 are inoperative, and thus array 213 is inaccessible to local site 218, as indicated by the broken arrow 1015. In this situation, as indicated by arrows 1020, write operations from the local host (ref. no. 101, shown in FIGS. 2 and 3), are directed by the initiator array controller (either 201 or 202 in FIGS. 2 and 3) to both array 203 and log unit 1000.

Extents and data are both written to log unit 1000, the format for which is described in detail below with respect to FIG. 13. The logging is done via write through to media. The log unit 1000 is required to have write-back disabled. Enabling write-back would require a DMA copy of the data so that it could be written to media at a later time. The DMA copy process incurs extra overhead, consumes resources, and adds complexity, so write-back mode is not desirable for the present logging function.

A log unit is 'replayed' to the remote site 'partner' controller when the link is restored, the remote site has been restored, or when the local site has been restored (during a site failback, described below with respect to FIG. 12). Replaying the log means sending all commands and data to the remote partner in order (for each remote copy set) for all remote copy sets associated with the log unit. A merging operation (hereinafter referred to as simply 'merge') is performed by system 100 to quickly return a remote copy set (both local and remote members) to the same data state (i.e., up to date) after link restoration or remote site restoration. A 'mergeback' operation is performed by system 100 to restore the local site back to the same state as the remote site during site failback, assuming that the initiator site is intact. Log units 1000 and 1001 are used to replay the transactions for the merge and mergeback functions, respectively. Because the present system may avoid having to perform a full copy, particularly when a site is down only temporarily, site failover can be performed for short down-time situations, since site failback/resynchronization is quickly accomplished.

Figure 11:
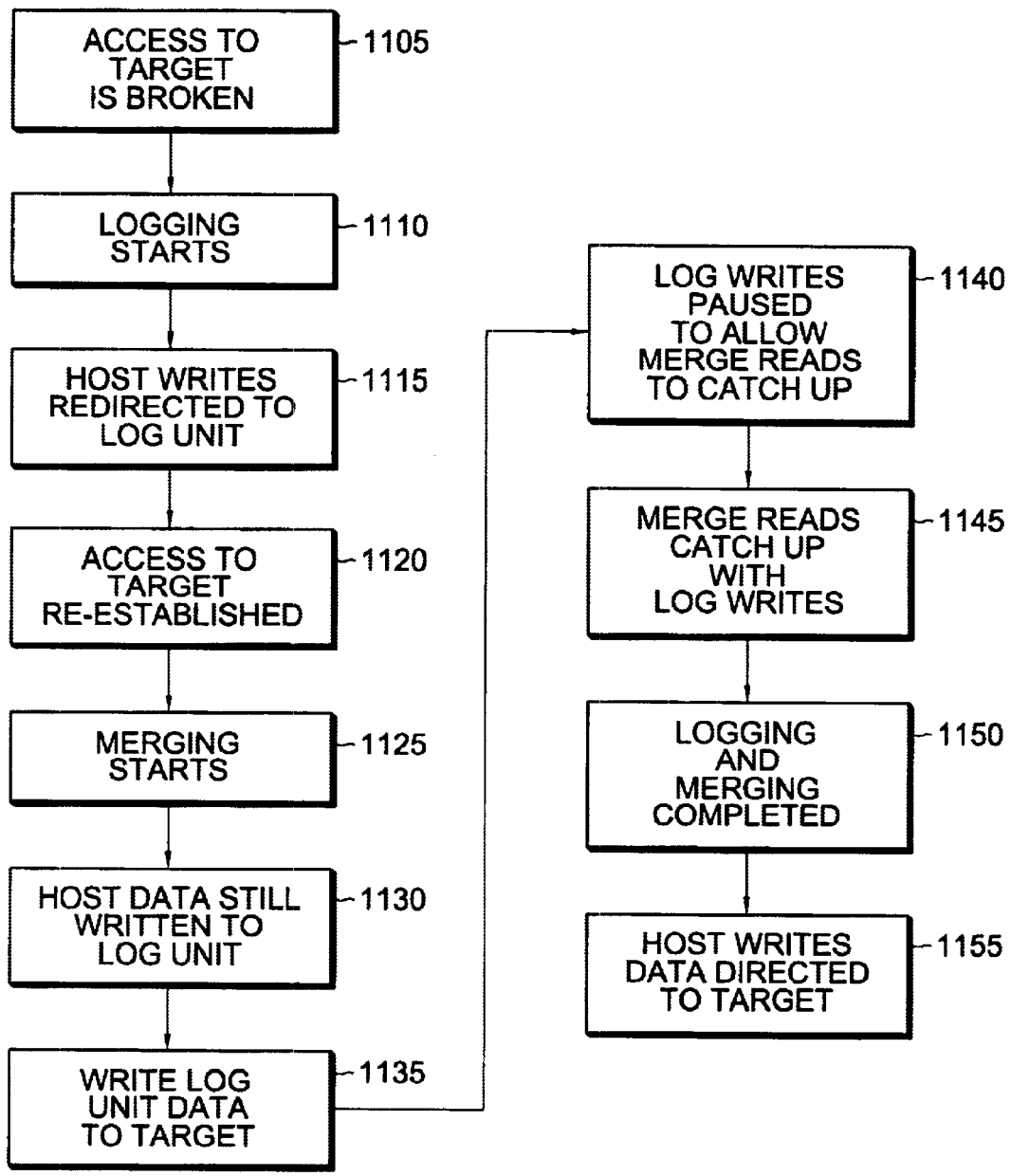
FIG. 11 is a flowchart showing log unit writing and merging operations.

FIG. 11 is a flowchart showing an exemplary write history log operation followed by an exemplary merge performed by the present system 100. As shown in FIG. 1, at step 1105, access from site 218 to target array 213 is broken, as indicated by arrow 1015 in FIG. 10. At step 1110, the write history logging operation of the present system is initiated by array controller 201 in response to a link failover situation, as explained above with respect to FIG. 9. Initiation of the logging function requires that assignment of a dedicated log unit 1000/1001 has been made by a system user. At step 1115, write operations requested by host computer 101/102 are redirected by associated initiator array controller 201 (optionally, controller 202) from target controller 211 to log unit 1000. The log unit descriptors reside at the beginning of the unit. The extent entries are logged before the data in a spiral fashion. FIG. 13, described below, shows the format of data and extent information stored on a log unit.

The present system allows different logging streams active at the same time to be intermixed. The log unit is not partitioned in any manner based on the presence of different log streams. If asynchronous operation is enabled, then asynchronous writes occur to the log unit, wherein completion status is returned prior to writing the log unit.

A step 1120, access to target array 213 is re-established, and at step 1125, the merging operation is initiated. At step 1130, the data and extent information from host computer 101 is still written to log unit 1000, but the host writes are delayed to allow the merge to catch up to the log writes. More specifically, the controller turns on a 'command throttle' to slow host I/O down, so the merge can make progress. Then at step 1135, a data read stream is started at the appropriate LBN of the log unit. The data is written to the remote target member using the normal remote copy path. The command order is preserved with the context stored in the log unit. At step 1140, writes to the log unit 1000 are paused, allowing merge read operations to completely catch up. At this point, there must be more merging I/O operations performed than host I/O operations to avoid reaching the end of the log unit. Therefore, when the merge stream catches up to the log stream, host writes are quiesced (temporarily queued) to make the transition. At step 1145, the merge reads catch up with the log writes. Finally, at step 1150, the log and merge operations are completed, and at step 1155, normal backup operation of system 100 is resumed.

Note that during a merge operation, it is not sufficient to send the data over the wire in an order compatible with the original write ordering—the data has to be written to "media" (either magnetic media or controller write-back cache) at the remote site in compatible order. This means the local and remote controllers have to control the number of outstanding write operations so that the execution of these commands cannot be reordered, even in the presence of Fibre Channel errors in the inter-controller link, to pervert this order. The present system merges the write commands in the proper order, including write commands which are allowed to overlap each other. For example, if during logging, the original host writes command A and it completes before it issues command C, then during merging, the "play back" must also finish command A before starting command C.

Figure 12:
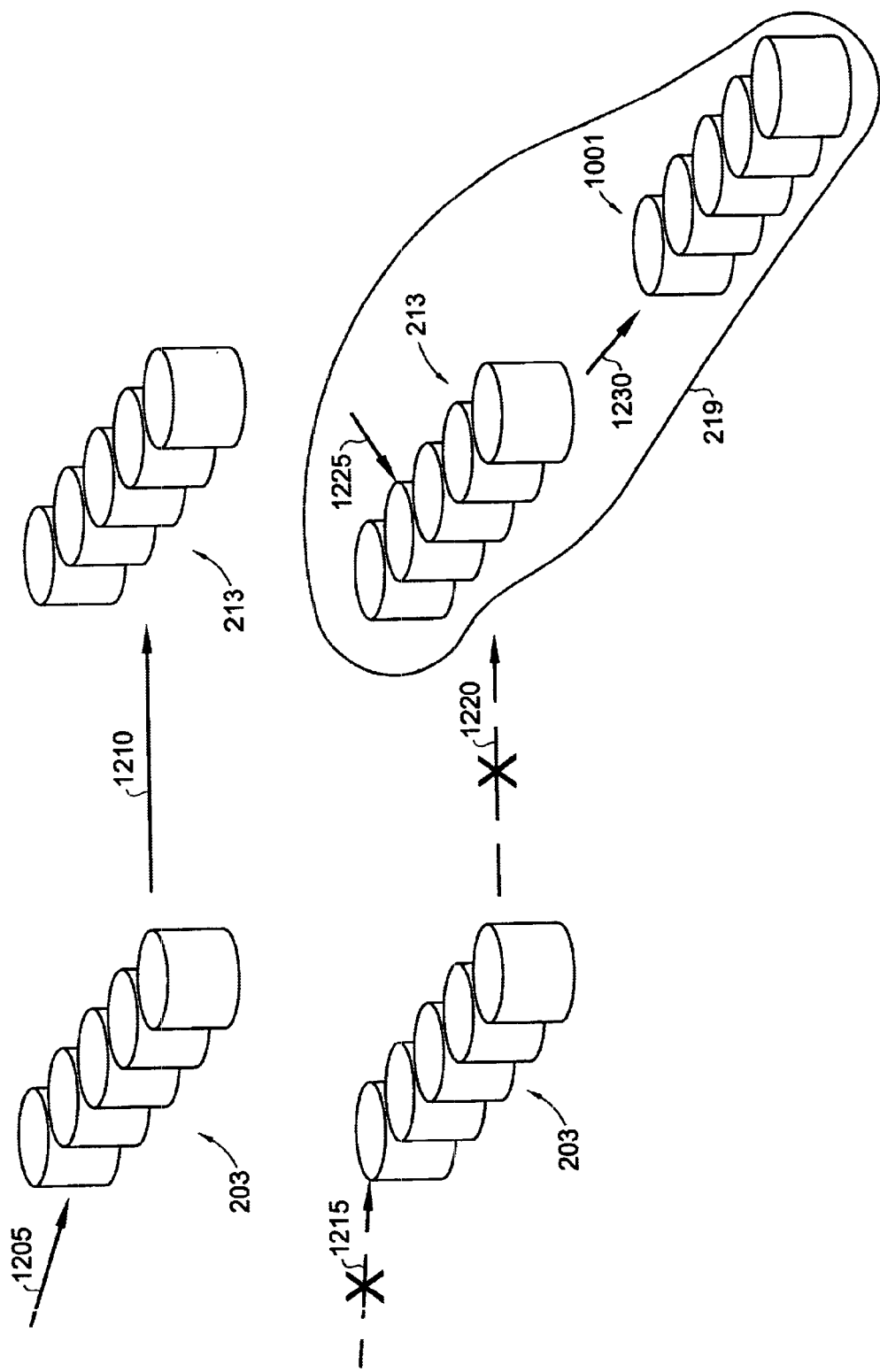
FIG. 12 is a flow diagram showing a log operation in response to a site failover.

FIG. 12 is a flow diagram showing a log operation in response to a site failover. As shown in FIG. 12, during the course of normal operations, host writes to array 203 are backed up on the corresponding remote copy set LUN in array 213, as indicated by arrow 1210. If, for example, array 203 becomes inaccessible by local host 101, as indicated by arrow 1215, then site failover is performed, since host 101 cannot write the local array 203, and the controllers at both sites cannot communicate with each other, so inter-site backup is not possible, as shown by arrow 1220. When site failover takes place, the existing remote copy set is deleted, and a new remote copy set is created with the original target member as the new initiator (now at site 219), and the original initiator as the new target member. The remote set consists of two members, as before the site failover. The new initiator unit now presents the WWID of the original initiator (remote copy set's WWID) to the host at site 219. In this situation, write operations from the host (102) at site 219 are directed by the initiator array controller (either 211 or 212, FIGS. 2 and 3) to array 213, as indicated by arrow 1225, and to log unit 1001, as shown by arrow 1230.

Upon site failback, merge-back takes place. The merge-back operation is analogous to the merge operation described with respect to FIG. 11, except that the 'initiator' unit during the merge-back operation is the LUN resident on array 1001, and the 'target' is the original initiator LUN. Initiator control is then moved back to the original initiator site after communication between sites.

Figure 13:
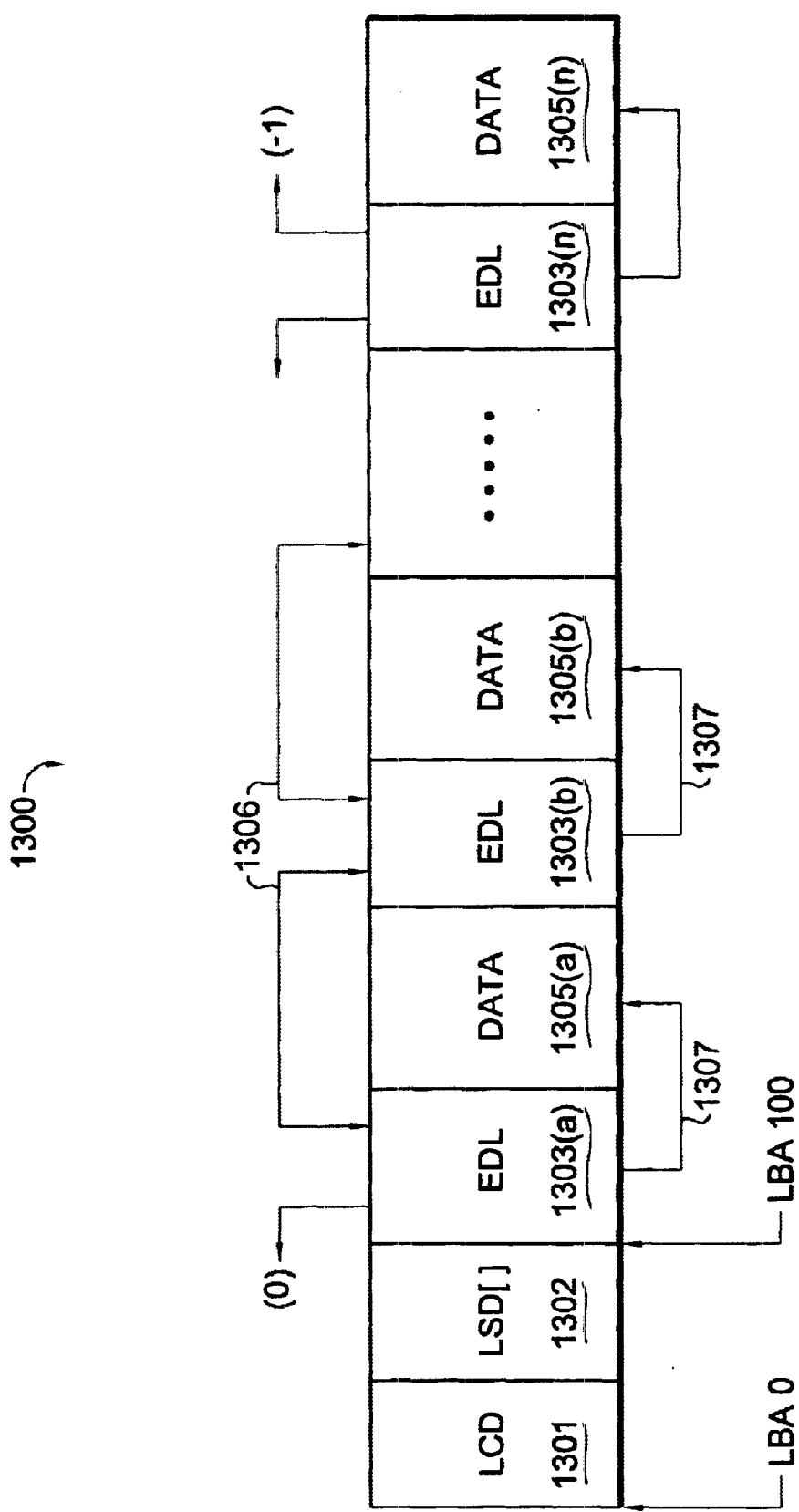
FIG. 13 is a diagram showing an exemplary format of data and extent information stored on a log unit.

FIG. 13 is a diagram showing an exemplary format 1300 of data and extent information stored on a log unit 1000/1001. As shown in FIG. 13, the Log Container (log unit) Descriptor ('LCD') 1301 starts at logical block address (LBA) 0, and is used to describe attributes of the log 'container' (i.e., the log unit). The LCD 1301 contains information comprising the log disk state (free, allocated, or in use), the current log position, and membership information, including (1) the initiator LUN ID, (2) the target LUN ID, and (3) the target name. The Log Stream Descriptor ('LSD') 1302 is used to describe the merging state and includes information such as the current log stream state (free, normal, logging, or merging), the current merge position, and target information which is bit-encoded to denote their specific LCD membership parameters. Following the LCD 1302 is a series of Extent Descriptor List/data segment pairs **1303\*/1305\*, starting at LBA 100. The Extent Descriptor List ('EDL') 1303\*** (where '\*' denotes the rank in the series) is used to describe the host write data, and includes an Extent Descriptor header and Extent Descriptor array [\*] member information. The Extent Descriptor header contains pointers 1306 to the next EDL and the previous EDL, more specifically, the next/previous EDL logical block address (LBA). The Extent Descriptor array member information includes (1) the LBA of the data at the target destination; (2) a pointer 1307 to the associated data segment 1303 on the log unit (the data LBA); (3) bit-encoded LCD membership parameters for the target(s), (4) a 'look-ahead limit' used to describe the host data write ordering, and (4), the block count for the associated data in the data segment 1303 following the particular EDL. The terminal EDL segment is indicated by a 'next EDL' LBA (flag) value of −1.

Storage Node Failover

Figure 15:
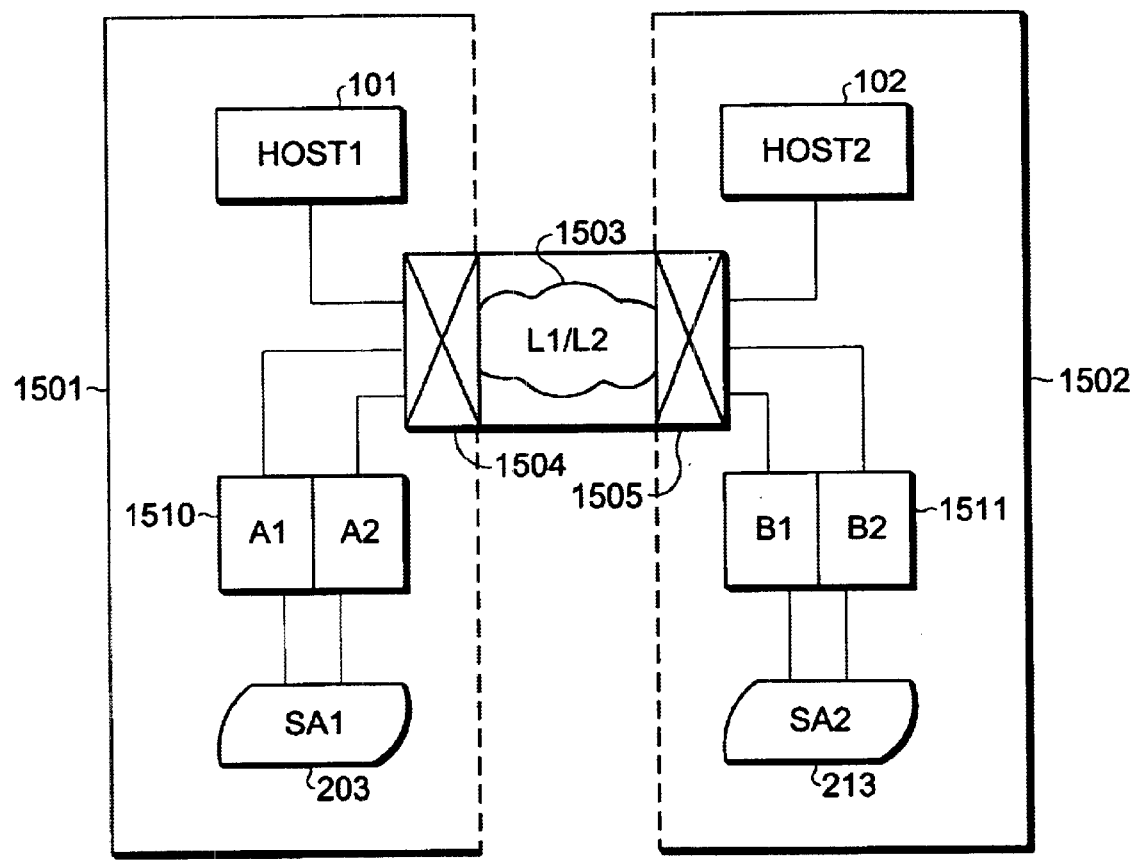
FIG. 15 is a block diagram illustrating the relationship between various system components in storage node failover operation, as well as in bidirectional system operation.

Storage node failover is a failover process that takes place between pairs of array controllers. Storage node failover pertains only to those LUNs (logical units) that are part of remote copy sets established between the array controllers. Other LUNs that are local to a given array controller are not part of the failover. FIG. 15 is a block diagram illustrating the relationship between various system components in storage node failover operation. As shown in FIG. 15, the pair of array controllers 1510, designated at A1/A2, are defined as the 'home node.' The home node is the pair of array controllers where host(s) normally access the LUNs for applications. The pair of array controllers 1511, designated as B1/B2, are defined as an 'alternate node.' The home/alternate node concept allows drivers in multiple hosts to 'know' that there are data replication operations being carried out between two nodes and that data is potentially available at both sites, but with priority given to the home node. The home node for a given host computer is the local initiator of data replication operations to the alternate node, or remote target.

In an exemplary embodiment of the present invention, remote copy sets are used with home nodes that present the LUNs; alternate nodes do not present the remote copy set LUNs until a site failover. In this case, a host computer on the local or remote side must have the notion of the home and alternate node(s) within the context of the host driver ('multi-path driver') which is responsible for monitoring available data I/O paths and re-routing I/O in failover situations. A list must be entered to the host (or hosts, if there are multiple host computers at a particular node) when configuring the system. This list contains the Node ID (64 bit WWID) of the home node pair of array controllers 1510 as well as the Node ID(s) of the alternate node array controller pair 1511. The host node 1510 selectively presents only those LUNs on the home node, which is the remote copy set (RCS) initiator, to host 101. The alternate node's RCS target LUN(s) are known by the multi-path driver, but are not presented to the host operating system.

The multi-path driver in the host addresses data storage I/O operations to the home node during normal remote copy system operation. In exception cases, where a site failover is performed, the multi-path driver addresses data I/O operations to the alternate node, since the home node is not available in such a situation. Assuming the host computer employs a lock manager, the home node and alternate node assignment provides local load balancing. FIG. 15 shows that node 1510 (controller pair A1/A2) is accessed locally by local host 101, while node 1511 (controller pair B1/B2) is accessed by remote host 102. Assuming that node 1510 is the home node for the local host, then node 1511 is the alternate node for local host 101. In the present case, node 1511 is the home node for remote host 102, while node 1510 is the alternate node for host 102. Site failover is not required in the present situation for LUNs to be present on both nodes 1510 and 1511.

Figure 14:
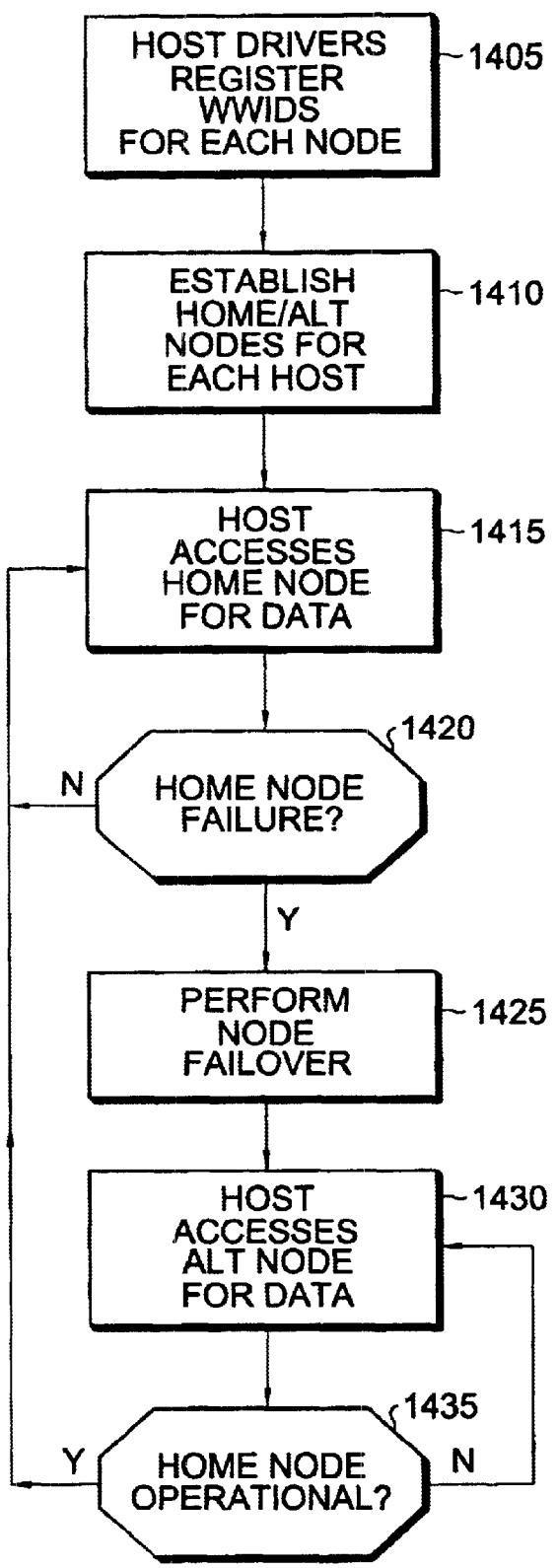
FIG. 14 is a flowchart of an exemplary storage node failover process.

FIG. 14 is a flowchart of an exemplary storage node failover process between pairs of array controllers. As shown in FIG. 14, at step 1405, the multi-path drivers in hosts 101 and 102 register the Fibre Channel WWIDs (World-Wide Identifiers) for each node, in this example, nodes 1510 and 1511. Having been given this association between WWIDs and nodes, at step 1410, each host driver can now look for data in both sites depending upon the availability of the home node and alternate node. In general, the hosts will always access their home node for data, as indicated by step 1415. At step 1420, in the event of a failure in the home node (e.g., node 1510 for host 101) where data cannot be accessed, then at step 1425 a node failover is initiated by the multi-path driver in host 101. Until the home node again becomes operational (at step 1435), the host uses the alternate node for data, as indicated by the loop at steps 1430 and 1435.

Bi-Directional Copy Operation and Extended Cluster Mode

The present system 100 includes the capability for simultaneous bi-directional remote data replication which permits the system to operate in an 'extended cluster' mode, as if each of the remote storage arrays were local relative to the respective remote host. As discussed in the previous section, FIG. 15 shows array controller pair A1/A2 as the local, 'home' node 1510, and array controller pair B1/B2 as the remote, 'alternate' node 1511. The use of the home/alternate node mechanism adds to the fault tolerant characteristics of the cluster because now if a pair of arrays becomes inoperative for whatever reason, the host on the other side of dual fabric 1503 can still maintain access to its storage. In bidirectional copy mode, the home/alternate node concept is extended from that described in the previous section, in that, now each host computer has its own home and alternate node.

If R/W (read and write) access is enabled on an array controller, then the controller will accept writes from any host, and then synchronously send the write over to its partner array controller. For example, assume local host 101 writes to controller A1/A2 after taking a lock out on the appropriate LUN(s). When controller (pair) A1/A2 receives the write request, A1/A2 proceeds to copy the write data to remote controller pair B1/B2. After A1/A2 has received 'success' status from B1/B2's reception of the write data, A1/A2 sends completion status to host 101. At some point, when host 102 writes to B1/B2, a similar, but reverse action occurs with respect to controller pairs B1/B2 and A1/A2. Locking of local LUNs by a host is performed in bidirectional copy mode because of the particular implementation of home/alternate node in this mode of operation, as explained above.

The present system achieves bidirectional copy operation by establishing a 'peer' relationship between array controller pairs on opposite sides of link 1503. Both array controller pairs A1/A2 and B1/B2 'see' the same volume name on opposite sides of the link, and both operate as if each one were 'master' with respect to a particular volume. In the present exemplary embodiment of system 100, remote copy set LUNs have both 'peer controller pairs' A1/B1 and A2/B2 as simultaneous initiator and target, so that writes to either side will be synchronously mirrored to an array controller's partner on the other side of dual fabric 1503. Furthermore, a LUN on one side of fabric 1503 can be set to read-only access, while its remote partner LUN can be set to R/W access. The combination of bi-directional copy with the capability of R/W access at one site and read-only access at the other site provides very useful functionality.

As an example of the bi-directional copy aspect of the present system 100, consider an Internet-based business having two web sites, one of which is located at site 1501, using a database on storage array SA1 (203), with the other web site located at site 1502, using a database on storage array SA2 (213). Assume that array SA2 at site 1502 is set to allow read-only access. Both sites 1501 and 1502 allow active reads, even though a given one (i.e., site 1502) may not actually be updating the data. Even though writes can take place only to array SA1 at site 1501, the writes are quickly mirrored on array SA2 at remote site 1502, so that customers accessing either site 'see' the same data, which is nearly immediately synchronized across both sites by the bi-directional copy operation of the present system.

Heartbeats (as described above with respect to FIG. 6A) are initiated from both sides of fabric 1503 at all times, to determine whether each controller's partner is operational. In the event of a partitioned cluster, which is the state that exists when the arrays and hosts lose access to each other across fabric 1503, both pairs of array controllers A1/A2 and B1/B2 will go mute with respect to the LUNs that are remote copy sets. For example, if controller pair B1/B2 lose communication with controller pair A1/A2, then A1/A2 and B1/B2 will no longer present LUNs (to either host) that are remote copy sets with respect to A1/A2. This prevents data corruption resulting from hosts that are writing on both sides of fabric 1503. If array controller A1/A2 is non-operational, but controller B1/B2 is 'up', then hosts (101 or 102) wanting continued access to B1/B2 must send a site failover command to B1/B2 to re-open the LUNs for access. The same command will work with respect to A1/A2 if B1/B2 is down and A1/A2 is up.

Figure 16:
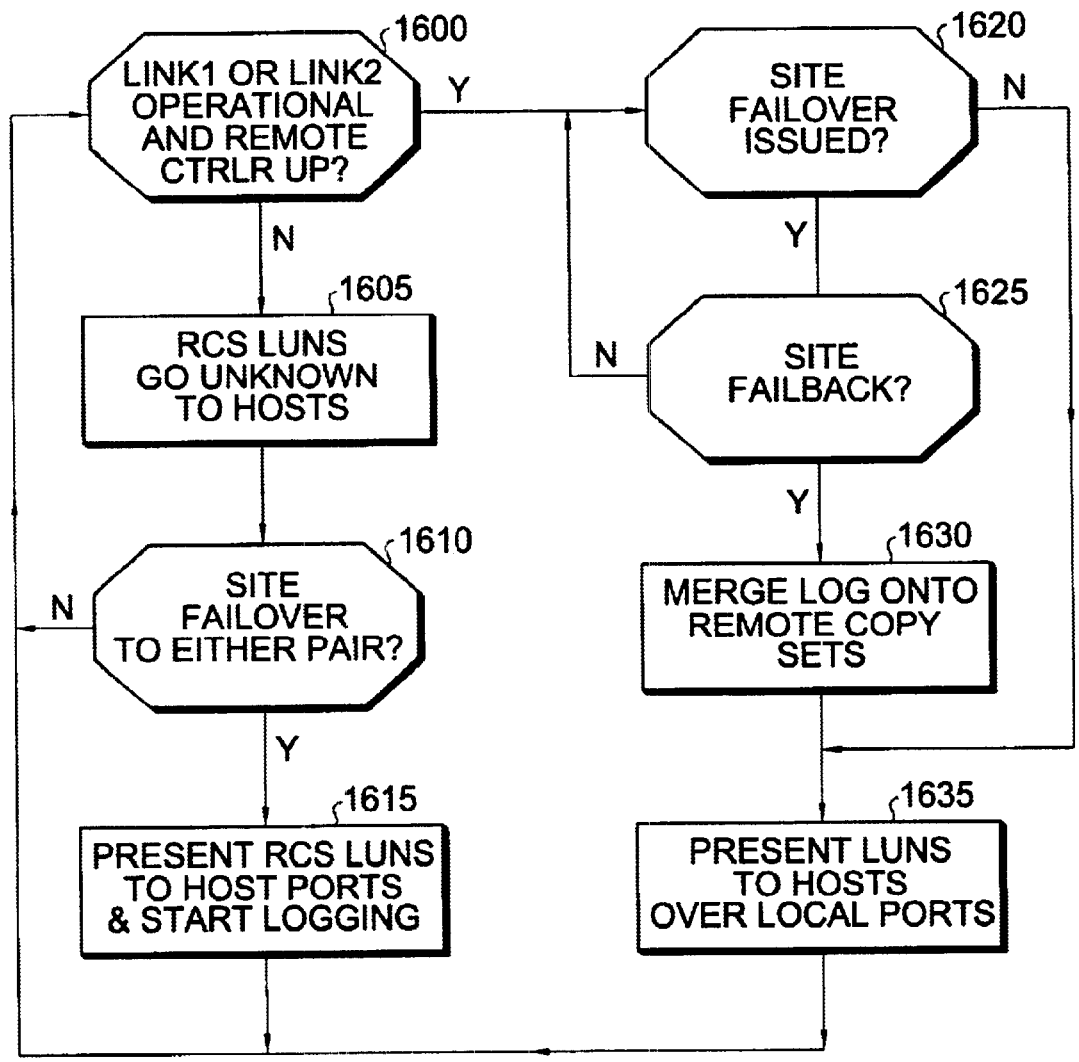
FIG. 16 is a flowchart of an exemplary method of system operation in extended cluster mode.

FIG. 16 is a flowchart of an exemplary method of system operation in extended-cluster mode. As shown in FIG. 16, at step 1600, if either link 1 or link 2 (indicated collectively by fabric 1503 and switches 1503/1505 in FIG. 15) is operational, and at least one cross-link array controller pair is in communication, then, assuming that a site failover command has not been issued (at step 1620), then at step 1635, LUNs residing on arrays SA1 and SA2 (at sites 1501 and 1502, respectively) are presented to respective local hosts 101 and 102. This sequence of steps 1600, 1620, and 1635, occurs during normal bidirectional copy operations of system 100.

A notable characteristic of the present (extended cluster) mode is the fact that when link 1503 is down, or when neither array controller A1/A2 can communicate with its partner B1/B2, then, at step 1605, all LUNs that are part of remote copy sets go 'unknown' (i.e., become inaccessible) to all hosts. This measure is taken to prevent data corruption in a partitioned cluster. However, a site failover to either pair of controllers at either site (step 1610) will cause the LUNs for that pair to again be visible to hosts at their particular site. At this same time, the log unit for each LUN, if present, will begin to have data logged to it, at step 1615, waiting for the eventual return of one or both links to the other site. A subsequent site failback, at step 1625, initiates a merge operation, at step 1630, which is performed in accordance with the procedure described above with respect to FIG. 11. Immediately following site failback, normal bi-directional copy operations are resumed as indicated by the loop comprising steps 1600, 1620, and 1635.

Association Sets

An association set is a group of logical units (a set of one or more remote copy sets) on a local or remote pair of array controllers with attributes for logging and failover that are selectable by a system user. Members of the group of logical units may share several different sets of properties. A first set of properties provides for multiple initiator units to log to (i.e., share) the same log container for space efficiency. A second set of properties allows logging, as well as in-order merging, of all transactions in order received to multiple logical units simultaneously. A third set of properties provides failure consistency. If one volume hits an unrecoverable data error, the group of logical units/volumes can be forced to all fail at the same time, ensuring a point in time consistency on the remote site.

Logging all transactions in order is important because some applications require in-order operations across a set of logical units/volumes. If a primary site disaster occurs, applications require consistent data at the secondary site, regardless of what I/O operations were in progress at the time of the disaster. Failure consistency is important because some applications write failure information to the other members of the group after such an unrecoverable error to one member, making all the data inconsistent and suspect across all logical volumes. If all the volumes fail if one member fails, then the remote site will have a consistent view of the data up to the point of failure. When all members fail, the local site logical units are unavailable to the hosts, thereby possibly requiring failover to the remote site.

Association sets are used by a host to keep multiple units consistent with each other to ensure, for example, that an application's data set remains consistent. This requires that if one member fails, host access is removed from all members, and/or that I/O order is kept across all members. From each array controller's point of view, an association set is the grouping of remote copy sets that all transition to the same state at the same time. The implication for write history logging/merge and asynchronous operation is that instead of maintaining write ordering just for one unit, the controller must maintain write ordering for all members within an association set (assuming that this mode is user enabled).

Remote copy set members may be in either synchronous or asynchronous operation mode, and may differ from the other members. All members of an association set must be on the same controller to enforce cache coherency. When members are added to an association set, they are moved to reside on the same controller, and will failover together.

Figure 17:
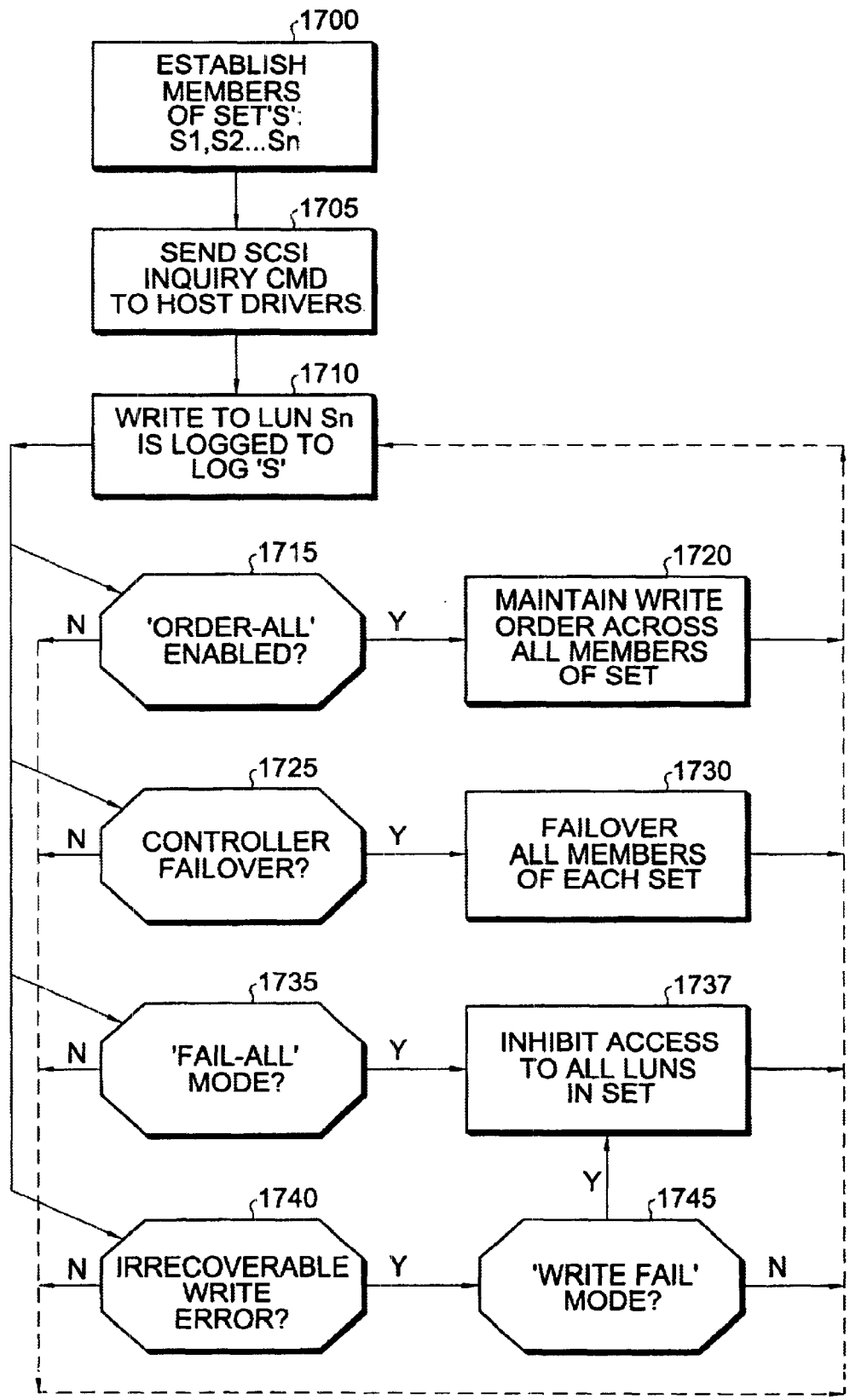
FIG. 17 is a flowchart illustrating an exemplary set of operations performed by the present system wherein 'association sets' are implemented.

FIG. 17 is a flowchart illustrating an exemplary set of operations performed by the present system 100 wherein 'association sets' are implemented. As shown in FIG. 17, at step 1700, the logical unit members S1 through Sn (where 'n' can be any number) of an association set 'S' are established by a system user. This information is provided to, and stored in memory for, each host computer in the form of 'association set name'/'remote copy set name' pairs. As indicated above, each logical unit which is a member of an association set must also be a member of a remote copy set. At step 1705, a SCSI inquiry command is sent to all host multi-path drivers indicating that a given LUN (remote copy set member) is part of a group of associated LUNs. Hosts send the Inquiry command to a specified LUN, and the controller responds with Inquiry response information. This information allows a host's multi-path driver to prevent LUNs from being 'thrashed' back and forth between array controller pairs.

At step 1710, remote copy operation of system 100 begins. Each write operation to LUN Sn is logged to log unit 'S', i.e., multiple logical units share the same log unit. At step 1715, a check is made to determine whether a mode termed 'Order All' has been selected. When 'Order All' is enabled by the user, and write history logging is in effect, then, at step 1720, instead of maintaining write ordering just for one logical unit, the system must maintain write ordering for all members within an association set. 'Order All' mode ensures that writes during a 'mini-merge' operation (a merge following write history logging) and asynchronous micro-merge writes are replayed in the same order received from the host. To preserve the order during merge requires all members of the association set to start logging if one of the association set members starts write history logging. With "Order All" mode enabled, this ordering is necessary even if the commands are to different units within an association set. All members of an association set which have 'Order All' enabled, enter and exit logging at the same time. Even though their targets may not share the same links and be down, they must enter logging together in order to preserve order. In 'Order All' mode, if at least one member is copying, and at least one member is logging, then when the log unit becomes ready (on boot-up, or controller failover), then all members start a full copy.

With 'Order All' mode disabled, all members of the association set are independent. For instance, they can start/finish write history logging independently and are not associated in any way with each other (other than sharing the same log unit). All remote copy sets share the same links, so logging will start on all remote copy sets when the links are down.

Association sets allow for a binding of one or more LUNs for LUN controller failover purposes as well. Therefore, at step 1725, if a controller serving associated LUNs fails, the set of LUNs in a association set will failover together to the partner controller, at step 1730. If one LUN moves over to the other controller (e.g., where the host is 'pushing' the unit over), then the other LUNs in the same association set also move over to the partner controller. If the controller fails, all LUNs are moved over, regardless of grouping. The log unit must always failover (between redundant controllers) with the remote copy sets assigned to the same association set. In addition, all members of an association set must reside on the same controller, and failover together and atomically.

At step 1735, a check is made to determine whether a mode termed 'Fail All' has been selected. 'Fail All' is a user-selectable option whereby all the LUNs in an association set fail if one member fails. If 'Fail All' error mode has been enabled by the user, then at step 1737, any I/O directed to any member of the association set will fail whenever the initiator array controller fails or target membership falls to zero. The remote copy set is considered 'failsafe locked' under this condition, effectively rendering the remote copy set inoperative or offline. With 'Fail All' enabled, if any member of the association set goes failsafe locked, then all members with 'Fail All' mode enabled go Failsafe Locked. If the 'Fail All' option is selected, then the remote site will have a consistent view of the data up to the point of failure. Changing a system error mode parameter to normal when a remote copy set is failsafe locked will allow I/O to resume.

An additional user-selectable mode related to association sets is available to cause all LUNs to be inaccessible locally if a write operation to one of the members in the association set resulted in an irrecoverable write error. This mode is called 'Write Fail' mode. If, at step 1740, an irrecoverable write error is incurred by an array controller write attempt on LUN Sn, then at step 1745, a check is made to determine whether 'Write Fail' mode has been selected. If selected, then just as in the case of array failure in 'Fail All' mode, step 1737 is performed, whereby any I/O operation directed to any member of association set 'S' will fail. 'Write Fail' mode prevents applications (e.g., Adabase) that might scribble on other associated members from corrupting a database shared by the members.

Although the above description refers to specific embodiments of the invention, the invention is not necessarily limited to the particular embodiments described herein. It is to be understood that various other adaptations and modifications may be made within the spirit and scope of the invention as set forth in the appended claims.

We claim:

1. In a data replication system having two sites each including a host computer and a node comprising a pair of array controllers coupled to a data storage array, a method for maintaining a consistent view of the data across a group of logical units, the method comprising:

establishing, in memory for each said host computer, correspondence between an association set name and a remote copy set name for each member of the group of logical units to generate an association set; and failing any I/O directed to any member of the association set whenever the one of the array controllers which is serving any said member of the association set fails, wherein one of the array controllers is an initiator controller, further including providing a user-selectable option which enables a Fail All mode wherein any I/O operation directed to any said member of the association set will fail whenever the initiator controller fails.

2. The method of claim 1, further including registering, with each said host computer, an identifier for each said logical unit, to establish an association therebetween.

3. The method of claim 1, wherein a log unit is located on the data storage array, and every said member of the association set shares the same log unit.

4. The method of claim 1, further including logging all transactions between the host computer and the data storage array in order with respect to all logical units in the association set.

5. The method of claim 1, wherein the two sites are interconnected by two Fibre channel fabric links.

6. The method of claim 1, wherein a log unit is located on the data storage array, and every said logical unit in the association set shares the same said log unit.

7. In a data replication system having two sites each including a host computer and a node comprising a pair of array controllers coupled to a data storage array, a method for maintaining a consistent view of the data across a group of logical units, the method comprising:

establishing, in memory for each said host computer, correspondence between an association set name and a plurality of logical units to generate an association set, wherein each of the logical units is a member of a remote copy set; and failing any I/O directed to any member of the association set whenever the one of the array controllers which is serving any said member of the association set fails, wherein one of the array controllers is an initiator controller, further including providing a user-selectable option which enables a Fail All mode wherein any I/O operation directed to any said member of the association set will fail whenever the initiator controller fails.

8. The method of claim 7, wherein a log unit is located on the data storage array, and every said member of the association set shares the same log unit.

9. The method of claim 7, further including logging all transactions between the host computer and the data storage array in order with respect to all logical units in the association set.

10. The method of claim 7, further including registering, with each said host computer, an identifier for each said logical unit, to establish an association therebetween.

* * * * *